(12) United States Patent
Roodenburg et al.

(10) Patent No.: US 10,288,194 B2
(45) Date of Patent: May 14, 2019

(54) MARINE REEL LAY METHOD PIPELINE INSTALLATION VESSEL AND METHODS

(71) Applicant: ITREC B.V., Schiedam (NL)

(72) Inventors: Joop Roodenburg, Delft (NL); Terence Willem August Vehmeijer, The Hague (NL); Hendrik Hessels, Franeker (NL)

(73) Assignee: ITREC B.V., Schiedam (NL)

( * ) Notice: Subject to any disclaimer, the term of this patent is extended or adjusted under 35 U.S.C. 154(b) by 278 days.

(21) Appl. No.: 15/307,660

(22) PCT Filed: Apr. 28, 2015

(86) PCT No.: PCT/NL2015/050285
§ 371 (c)(1),
(2) Date: Oct. 28, 2016

(87) PCT Pub. No.: WO2015/167328
PCT Pub. Date: Nov. 5, 2015

(65) Prior Publication Data
US 2017/0051847 A1    Feb. 23, 2017

(30) Foreign Application Priority Data
Apr. 29, 2014 (NL) .................................. 2012711

(51) Int. Cl.
| | | |
|---|---|---|
| F16L 1/23 | (2006.01) | |
| F16L 1/16 | (2006.01) | |
| F16L 1/20 | (2006.01) | |
| B63B 35/03 | (2006.01) | |
| E21B 19/22 | (2006.01) | |
| E21B 19/00 | (2006.01) | |
| E21B 19/06 | (2006.01) | |
| E21B 19/24 | (2006.01) | |
| E21B 15/02 | (2006.01) | |

(52) U.S. Cl.
CPC ................ F16L 1/16 (2013.01); B63B 35/03 (2013.01); E21B 19/006 (2013.01); E21B 19/008 (2013.01); E21B 19/06 (2013.01); E21B 19/22 (2013.01); E21B 19/24 (2013.01); F16L 1/20 (2013.01); F16L 1/203 (2013.01); F16L 1/23 (2013.01); E21B 15/02 (2013.01)

(58) Field of Classification Search
CPC .................. F16L 1/19; F16L 1/20; F16L 1/23
See application file for complete search history.

(56) References Cited

U.S. PATENT DOCUMENTS

| | | | |
|---|---|---|---|
| 7,226,244 B1 | 6/2007 | De Groot et al. | |
| 2009/0324339 A1* | 12/2009 | Roodenburg | F16L 1/19 |
| | | | 405/166 |

FOREIGN PATENT DOCUMENTS

| | | |
|---|---|---|
| GB | 2 303 897 A | 3/1997 |
| WO | WO 03/019061 A1 | 3/2003 |
| WO | WO 2007/108673 A1 | 9/2007 |
| WO | WO 2012/091556 A1 | 7/2012 |

(Continued)

*Primary Examiner* — Sunil Singh
(74) *Attorney, Agent, or Firm* — Birch, Stewart, Kolasch & Birch, LLP

(57) ABSTRACT

In a vessel and method for laying on the seabed a pipeline and one or more accessories which are to be connected to the pipeline, in particular in view of the installation of accessories to the pipeline, the one or more tensioners are displaceable along the pipeline launch tower.

21 Claims, 15 Drawing Sheets

(56) References Cited

FOREIGN PATENT DOCUMENTS

WO     WO 2012/101233 A2    8/2012
WO     WO 2014/148907 A1    9/2014

\* cited by examiner

MARINE REEL LAY METHOD PIPELINE INSTALLATION VESSEL AND METHODS

The present invention relates to the field of marine reel lay method pipeline installation.

From the prior art reel lay vessels are known for laying on the seabed a pipeline and one or more accessories which are to be connected to the pipeline, forming a launched pipeline having a weight, according to the reel lay method. An example of a marine reel lay pipelaying vessel of the same applicant is disclosed in WO2007/108673.

These prior art vessels commonly are equipped with one or more storage reels for storage of pipeline to be laid. The vessels also are equipped with a pipeline launch tower mounted to the vessel, which pipeline launch tower is adapted to launch the pipeline in a firing line along said tower. The vessel may be provided with a moonpool, and the pipeline launch tower is often placed adjacent or over the moonpool, such that the firing line extends through the moonpool. The pipeline launch tower can also be placed or at another suitable location, e.g. at the stern of the vessel. In general the term tower here refers to a raised structure on the vessel.

It is also known to provide a pipeline guide at an elevated position on said tower providing a curved path for guiding said pipeline from the storage reel over the pipeline guide into the firing line. Known pipeline guides include a large diameter pipeline guide wheel or a semi-circular guide structure, e.g. provided with rollers or chains.

In known reel lay pipelaying systems one or more pipeline tensioners, commonly one, two or three tensioners are supported by the tower at different heights below the curved or circular pipeline guide.

In a common design each pipeline tensioner has a tensioner frame and multiple tracks (also called caterpillars), often three, four or six tracks, supported by said tensioner frame. The tracks are adapted for engaging the pipeline and supporting at least part of the weight of the launched pipeline. In practice a single tensioner can be designed to support a pipeline weight of more than 200 tons, and tensioner capacities of more than 500 tons are also known.

It is known to mount the tracks in a movable manner in said tensioner frame in order to allow for adjustment of the gap between the tracks to accommodate various pipeline diameters.

It is also known from the prior art to design the tensioner frame "oversized" with respect to regular pipeline diameters, so that the gap between the tracks can be increased to a large size which allows for the passage of an accessory fitted on (the end of) or in the pipeline, e.g. a connector on the end of or in a flexible pipeline. Such connectors are bulky and have a diameter substantially greater than the pipeline diameter, e.g. having a diameter of more than 1 meter for connectors in flexible offshore pipeline.

In WO2007/108673 furthermore a hang-off clamp is disclosed, supported in the lower part of the firing line, adapted to clamp and support the weight of the launched pipeline in the firing line, which may add up to several hundreds of tonnes, when it has been severed from the pipeline section that is held by the tensioners. These hang-off clamps commonly include multiple mobile clamp parts allowing the clamp to be opened for release and passage of the pipeline and an accessory and closed for support of the pipeline. The hang-off clamp may be supported by the tower. However, preferably, the hang-off clamp is supported on the hull of the vessel, e.g. via a hatch over the moonpool or otherwise.

This known vessel also has an A & R system for abandonment and recovery of a pipeline. The A&R system comprises an A&R winch and A&R cable, as well as an an A&R sheave arrangement with one or more sheaves provided at an upper position in the firing line, said one or more sheaves being supported by the pipeline launch tower, adapted to raise, lower and support the weight of the launched pipeline in the firing line. The A&R cable is a very strong cable, e.g. designed to carry a load of several hundreds of tonnes, e.g. a 600 mt capacity cable.

In WO2007/108673 furthermore an accessory handling device is disclosed, adapted to position the accessory in an accessory position in the firing line, between the hang off device and the A&R sheave arrangement.

A common method for providing an accessory, such as a PLET, at the trailing end of a pipeline, e.g. as possible with the vessel of WO2007/108673, comprises the steps of:
  laying the pipeline while engaged by the tensioners;
  interrupting pipelaying by engaging the hang off device with the launched pipeline, transferring the weight of the launched pipeline to the hang off device;
  severing the pipeline above the hang off device;
  positioning the accessory in the accessory position in the firing line by the accessory handling device;
  connecting the accessory to the end of the launched pipeline supported by the hang off device and to the A&R system;
  releasing the hang off device from the launched pipeline;
  operating the A&R winch and thereby lowering the accessory and the pipeline by the A&R system.

A common method for providing a pipeline with an end connector at its leading end, e.g. as possible with the vessel of WO2007/108673, comprises the steps of:
  providing tensioners wherein the tracks and/or parts of the tensioner frame supporting the tracks are mounted in a movable manner to change the gap between the tracks between a pipeline engagement position wherein the gap is relatively narrow and an accessory passage position wherein the gap is relatively large;
  positioning the tensioners in the accessory passage position;
  launching a pipeline with an end connector at its leading end via the pipeline guide into the firing line and past the tensioners;
  moving the tracks in the tensioner frame to the pipeline engagement position, thereby engaging the pipeline;
  laying the pipeline.

Generally, an initiation winch is provided to launch the leading end connector via the pipeline guide into the firing line.

In an alternative method for providing a pipeline with an end connector at its leading end as possible with the vessel of WO2007/108673, the tensioner frame is displaceable with respect to the tower between an active pipeline engagement position and a retracted and non-operable position allowing the passage of an end connector.

It has been found that existing marine reel lay method pipeline installation vessels and methods are not entirely satisfactory.

Therefore it is an object of the present invention to provide an improved vessel and method for laying on the seabed a pipeline and one or more accessories which are to be connected to the pipeline, in particular in view of the installation of accessories to the pipeline, e.g. accessories at the leading or trailing end of a pipeline, and of pipelines with end connectors at the leading and/or trailing end. Examples of accessories are Pipeline End Terminals (PLET's) and/or intermediate Pipeline accessories (ILS), e.g. having one or more valves and/or one or more pipeline branching devices, e.g. with one or more pipeline tie-in devices, connectors, initiation fittings, inline SLED assemblies, inline manifolds, pipe valves, tee assemblies with their supporting structures and mud-mats.

The invention proposes a marine reel lay method pipeline installation vessel according to the preamble of claim 1, which is characterized in that the one or more tensioner frames are displaceable supported by a tensioner rail which is mounted to the pipeline launch tower, extending parallel to the firing line, allowing the one or more tensioners to be displaceable in the firing line, along the pipeline launch tower, at least between an upper accessory handling position wherein the one or more tensioners have moved above the accessory position and a lower pipelaying position wherein the one or more tensioners at least partially overlap the accessory position, and in that a tensioner displacement drive is provided to support and displace the one or more tensioners along the pipeline launch tower.

The invention further relates to a marine reel lay method pipeline installation vessel for laying on the seabed a pipeline and one or more end connectors on the pipeline, forming a launched pipeline having a weight, wherein the vessel comprises:
   one or more pipeline storage reels for storage of pipeline to be laid;
   a pipeline launch tower mounted to the vessel, which pipeline launch tower is adapted to launch the pipeline in a firing line along said tower;
   a pipeline guide which is supported at an elevated position by the pipeline launch tower, which pipeline guide is adapted to guide the pipeline from the storage reel over the pipeline guide into the firing line,
   one or more tensioners, each tensioner comprising a tensioner frame supported by the pipeline launch tower and multiple tracks supported by said tensioner frame, said tracks being adapted to engage the pipeline and to support at least part of the weight of the launched pipeline in the firing line,
   a hang off device supported in the lower part of the firing line, adapted to clamp and support the weight of the launched pipeline in the firing line;
   an abandonment and recovery (A&R) system comprising at least one A&R winch and A&R cable, and an A&R sheave arrangement with one or more sheaves provided at an upper position in the firing line, said one or more sheaves being supported by the pipeline launch tower, adapted to raise, lower and support the weight of the launched pipeline in the firing line;
   an end connector handling device adapted to position the end connector in an end connector entry position in the firing line above the one or more tensioners;
characterized in that
the one or more tensioner frames are displaceable supported by a tensioner rail which is mounted to the pipeline launch tower, extending parallel to the firing line, allowing the one or more tensioners to be displaceable in the firing line, along the pipeline launch tower, at least between a lower parking position wherein the one or more tensioners have moved below the end connector entry position and an upper pipelaying position wherein the one or more tensioners at least partially overlap the end connector entry position,
and in that a tensioner displacement drive is provided to support and displace the one or more tensioners along the pipeline launch tower.

The invention further relates to a marine reel lay method pipeline installation vessel for laying on the seabed a pipeline and one or more accessories which are to be connected to the pipeline, forming a launched pipeline having a weight, wherein the vessel comprises:
   one or more pipeline storage reels for storage of pipeline to be laid;
   a pipeline launch tower mounted to the vessel, which pipeline launch tower is adapted to launch the pipeline in a firing line along said tower;
   a pipeline guide which is supported at an elevated position by the pipeline launch tower, which pipeline guide is adapted to guide the pipeline from the storage reel over the pipeline guide into the firing line,
   one or more tensioners, each tensioner comprising a tensioner frame supported by the pipeline launch tower and multiple tracks supported by said tensioner frame, said tracks being adapted to engage the pipeline and to support at least part of the weight of the launched pipeline in the firing line,
   a hang off device supported in the lower part of the firing line, adapted to clamp and support the weight of the launched pipeline in the firing line;
   an abandonment and recovery (A&R) system comprising at least one A&R winch and A&R cable, and an A&R sheave arrangement with one or more sheaves provided at an upper position in the firing line, said one or more sheaves being supported by the pipeline launch tower, adapted to raise, lower and support the weight of the launched pipeline in the firing line;
   an accessory handling device adapted to position the accessory in an accessory position in the firing line between the hang off device and the A&R sheave arrangement;
characterized in that
the one or more tensioner frames are displaceable supported by a tensioner rail which is mounted to the pipeline launch tower, extending parallel to the firing line, allowing the one or more tensioners to be displaceable in the firing line, along the pipeline launch tower, at least between an accessory handling position wherein the one or more tensioners have moved away from the accessory position and a distinct pipelaying position wherein the one or more tensioners at least partially overlap the accessory position,
and in that a tensioner displacement drive is provided to support and displace the one or more tensioners along the pipeline launch tower.

For completeness, it is noted that the pipelaying position is intermediate the lower parking position (or end connector handling position) and the upper accessory handling position.

The invention furthermore relates to a marine reel lay method for laying on the seabed a pipeline and one or more accessories which are to be connected to the pipeline, thereby forming a launched pipeline having a weight, method comprising the step of providing a pipeline installation vessel according to claim 1, 13 or 14.

The inventive vessel and method thus enable a variable position of the one or more tensioners with respect to the pipeline launch tower.

The displaceable tensioners enable a reduced overall height of the pipeline launch tower. Amongst the advantages of the relatively lower overall height of the pipeline launch tower are its reduced weight and the lowered point of gravity. In addition, the reduced overall height may be advantageous in view of logistics, and improve the operational area of such a vessel. For example, sometimes the vessel has to come close to a large building on the quayside, close to a drilling rig, or it has to travel and pass under a structure like a bridge having a relatively small clearance, e.g. the Bosphorus bridge. An effect of the reduced height is that lowering the pipeline launch tower will no longer be required in a number of places. Hence, possibly the presence of adjusters, which are expensive facilities to be able to lower a pipelaying tower, may be dispensed with.

The possibility to lower the point of gravity is advantageous during transport of the marine reel lay method pipeline installation vessel to and from the location where the pipeline and one or more accessories is to be laid on the seabed, and during severe weather conditions in which the vessel is to be brought into a so-called 'survival mode'. In these situations, it is desirable for the vessel to have a low point of gravity. The large loads acting on the tensioners require a sturdy design of the tensioners, generally resulting in tensioners with a significant weight. Hence, a vessel wherein the one or more tensioners can be lowered into a lower position results in a vessel with a low point of gravity, as is desirable during transport and in the survival mode.

In embodiments, the one or more tensioners are movable to a lowermost parking position, wherein the one or more tensioners have moved to a position close to the hang off device. It is conceivable that this is also a pipelaying position, or that this parking position is even below a pipelaying position.

An advantage of the variable position of the one or more tensioners is also apparent when reviewing the above-indicated method for providing an accessory at the trailing end of a pipeline. This common method requires the tensioners to be positioned in the firing line, above the accessory position.

According to the present invention, it is possible to position the one or more tensioners at the pipelaying position during pipelaying, and raise the one or more tensioners to an upper accessory handling position wherein the one or more tensioners have moved above the accessory position to introduce the accessory. The present invention relates to a marine reel lay method for laying on the seabed a pipeline and one or more accessories which are to be connected to the pipeline, thereby forming a launched pipeline having a weight, in particular for providing an accessory at the trailing end of a pipeline, comprising the steps of:
  positioning the one or more tensioners in the pipelaying position by the tensioner displacement drive;
  laying the pipeline;
  interrupting pipelaying by engaging the hang off device with the launched pipeline;
  transferring the weight of the launched pipeline to the hang off device;
  severing the pipeline above the hang off device;
  displacing the one or more tensioners to the upper accessory handling position by the tensioner displacement drive;
  positioning the accessory in the accessory position in the firing line by the accessory handling device;
  connecting the accessory to the end of the launched pipeline supported by the hang off device and to the A&R system;
  releasing the hang off device from the launched pipeline;
  operating the A&R winch and thereby lowering the accessory and the pipeline by the A&R system.

In yet another advantageous method according to the invention, in particular for providing an accessory with a pipe end at the leading end of a pipeline, the following steps are performed:
  positioning the tensioners in the upper accessory handling position by the tensioner displacement drive;
  positioning the accessory in the accessory position in the firing line by the accessory handling device;
  connecting the accessory to the A&R system;
  lowering the accessory and by the A&R system until the pipe end of the accessory has reached the hang off device;
  supporting the pipe end of the accessory by the hang off device, disconnecting the A&R system from the accessory;
  positioning the tensioners in the pipelaying position by the tensioner displacement drive;
  launching a pipeline via pipeline guide into the firing line, the tracks of the tensioners engaging the pipeline;
  connecting the pipeline to the accessory;
  disconnecting the hang off device, and
  laying the pipeline with the accessory.

An advantage of the variable position of the one or more tensioners is also apparent when reviewing the above-indicated method of the invention for providing a pipeline with an end connector at its leading end. This common method requires the tensioners to be positioned in the firing line, at a distance below the pipeline guide, allowing the end connector to enter the firing line.

According to the present invention, it is possible to position the one or more tensioners in a lowermost parking position during launching the end connector and pipeline into the firing line, and raise the one or more tensioners to the intermediate pipelaying position to continue pipelaying. In this respect, the 'parking position' may also be referred to 'end connector handling position'. The present invention further relates to a marine reel lay method for laying on the seabed a pipeline and one or more end connectors on the pipeline, thereby forming a launched pipeline having a weight, in particular for launching a pipeline with an end connector at its trailing end, comprising the steps of:
  providing tensioners wherein the tracks and/or parts of the tensioner frame supporting the tracks are mounted in a movable manner to change the gap between the tracks between a pipeline engagement position wherein the gap is relatively narrow and an accessory passage position wherein the gap is relatively large;
  positioning the one or more tensioners in the pipeline engagement position and in the pipelaying position and laying the pipeline;
  positioning the one or more tensioners in the accessory passage position and in a lowermost end connector handling by the tensioner displacement drive;
  the end connector entering the end connector entry position in the firing line by the end connector handling device,
  connecting the end connector to the A&R system;
  lowering the end connector and the pipeline connected thereto by the A&R system past the one or more tensioners.

The present invention further relates to a marine reel lay method for laying on the seabed a pipeline and one or more end connectors on the pipeline, thereby forming a launched pipeline having a weight, in particular for launching a pipeline with an end connector at its leading end, comprising the steps of:
  providing tensioners wherein the tracks and/or parts of the tensioner frame supporting the tracks are mounted in a movable manner to change the gap between the tracks between a pipeline engagement position wherein the gap is relatively narrow and an accessory passage position wherein the gap is relatively large;

positioning the tensioners in the accessory passage position and in a lowermost end connector handling by the tensioner displacement drive;

the end connector entering the end connector entry position in the firing line by the end connector handling device;

lowering the end connector and the pipeline connected thereto by the end connector handling system past the one or more tensioners;

positioning the one or more tensioners in the pipeline engagement position and in the pipelaying position and laying the pipeline.

An initiation winch and wire may be provided, which are connectable to the leading end connector to pull the end connector up to the pipeline guide and into the firing line.

It is both conceivable that the pipeline to be laid according to the invention is a relatively rigid pipeline or a relatively flexible pipeline. It is common that for rigid pipelay a straightener device is provided between the tensioners and the pipeline guide.

In embodiments, only a single tensioner is provided. A tensioner is commonly embodied to support a pipeline weight of at least 100 tons, e.g. between 150 and 500 tons.

In alternative embodiments, an upper and a lower tensioner are provided. It is conceivable that the tensioner frame of the lower tensioner is supported by the tensioner frame of the upper tensioner, and that the tensioner displacement drive engages the tensioner frame of the upper tensioner, to displace both the upper and the lower tensioner. Alternatively, the tensioner displacement drive is connected to both the upper and lower tensioner individually, to displace the upper and lower tensioner. Yet alternatively, separate tensioner displacement drives are provided to displace the upper and lower tensioner individually. In such an embodiment, it may also be possible to displace the upper and lower tensioner with respect to each other.

In embodiments, the pipeline guide is movably supported by a guide frame supported by the tower, e.g. via a mechanism as disclosed by the applicant in WO2012/091556, or via a mechanism as described by the applicant in WO2014/148907.

Advantageously, the guide frame enables displacement of the pipeline guide between a pipelaying position in which the pipeline guide guides the pipeline from the storage reel over the pipeline guide into the firing line, and a retracted, non-operable position, wherein the pipeline guide has moved away from the firing line. Accordingly, the upper end of the firing line is cleared. According to the invention, the one or more tensioners are movable to an upper accessory handling position, in an upper position of the pipeline launch tower. A pipeline guide is to be positioned above this upper position in the firing line. The overall height of the pipeline launch tower can be reduced in embodiments wherein the upper accessory handling position of the tensioner frame overlaps the pipelaying position of the pipeline guide in the firing line, and wherein the pipeline guide is retractable out of the firing line. In such embodiments, one or more tensioners can be positioned in the firing line instead of the pipeline guide.

In embodiments, the one or more tensioner frames are provided with wheels engaging on the rail.

In embodiments, the pipeline launch tower is embodied as a single column. Alternatively, pipeline launch towers are known comprising two vertical leg members. Each vertical leg is preferably provided with a tensioner rail, e.g. a rail. Alternatively, a tensioner rail is provided between the vertical leg members of the pipeline launch tower. In embodiments, the pipeline launch tower is mounted pivotably to the vessel.

Advantageously, the tensioner rails extend over the entire length of the pipeline launch tower, hence, from the lower end of the tower where the pipeline launch tower is mounted to the vessel, up to the upper end of the pipeline launch tower, e.g. up to the elevated position of the pipeline launch tower to which the pipeline guide is mounted. As indicated above, in embodiments the tensioner rail and the position to which the pipeline guide is mounted overlap, allowing the upper accessory handling position of the tensioner frame tot overlap the pipelaying position of the pipeline guide in the firing line.

In embodiments, the total distance between upper accessory handling position and the pipelaying position, or a lowermost parking position is between 5-15, in particular 8-12 meters.

In embodiments, the tensioner frames are provided with wheels engaging on the rails. For example, a tensioner frame is provided with four wheels at its corners, two wheels engaging the rail of a vertical leg member, and the opposed two wheels engaging the rail of the opposed vertical leg member. It is also conceivable that the tensioner frame is provided with multiple bogies, e.g. four bogies at the corners of the tensioner frame, wherein each bogie is provided with wheels engaging on the rails.

Above, a method according to invention for providing a pipeline with an end connector at its leading end is disclosed, wherein the end connector, i.e. a bulky item having a diameter substantially greater than the pipeline diameter, is allowed to pass through a tensioner. To this end, at least the tracks of the tensioner are mounted in a movable manner in said tensioner frame to change the gap between the tracks, between a pipeline engagement position wherein the gap is relatively narrow and an accessory passage position wherein the gap is relatively large.

Tensioners of which the tracks are mounted movable to enlarge the gap are commonly known. A disadvantage of such a tensioner having an "oversized" tensioner frame is that in order to maintain good tensioning properties, oversizing the frame is limited. Hence, in order to allow the passage of larger connectors, alternative solutions for the passage of an end connector or other accessory past the one or more tensioners are preferred.

It is conceivable that the one or more tensioner frames are displaceable supported by the tensioner rail via at least one tensioner frame support assembly. Hence, not just the tracks are mounted movable but the tensioner frame is mounted movable to enlarge the gap.

In yet an alternative solution, the tensioner frame comprises two or more segments, preferably discrete segments, comprising a first segment and at a second segment, each including at least one track. In an embodiment of a tensioner comprising four tracks, advantageously both the first and second segment each include two tracks. In such an embodiment, both the first and second segment are mounted pivotable about a vertical segment pivot axis to a tensioner frame support assembly, the segments being movable between a closed operational position wherein the segments are conjoined to form an enclosing pipeline annulus in which the tracks are adapted to engage the pipeline; and an open retracted position wherein the first and second segments are disconnected and separated, thereby creating a clear envelope in the firing line. In the open retracted position of the hingeable frame segments a lateral opening is created in the tensioner frame structure over the entire height thereof, allowing for the lateral introduction and/or removal of a pipeline or other item into the firing line. Hence, two frame parts comprising tracks are mounted movable to enlarge the gap. In embodiments, a free passage diameter of up to 5-6 meters, or even up to 7 meters is possible.

In embodiments, the segments are mounted to distinct tensioner frame support assemblies. Possibly, the distinct tensioner frame support assemblies can be driven separately, allowing the segments to be at different heights. In such an embodiment, possibly aligned stops are provided to position the distinct tensioner frame support assemblies prior to fixing them in an upper accessory handling position, a lower pipelaying position or a parking position.

The above described embodiment of a tensioner frame comprising two or more segments movable between a closed operational position and an open retracted position wherein a clear envelope is created in the firing line is particular advantageous for handling a SLOR (Single Line Offset Riser) and/or COR (Concentric Offset Riser), which are very large accessories to be connected to a pipeline, which may even be as large as the pipeline launch tower.

Advantageously, a vertical trolley rail is supported by the tensioner frame support assembly between the two vertical segment pivot axes, preferably at least over the entire length of the one or more tensioners. An auxiliary trolley may be provided, which is adapted to guide an accessory along the vertical trolley rail in the pipeline launch trajectory when the first and second segments are in the open retracted position. Possibly, but not necessarily, the auxiliary trolley supports the weight of the accessory. The auxiliary trolley may be provided with a clamp or retainer to engage the accessory.

In embodiments, further a vertical trolley rail segment is provided, adapted to be positioned in line with the vertical trolley rail below the tensioners adjacent the accessory position, possibly until a position below the hang off device, such that the auxiliary trolley is movable to a position below the lowermost tensioner.

In embodiments, further a vertical trolley rail segment is provided, adapted to be positioned in line with the vertical trolley rail above the tensioners adjacent the accessory position, possibly until a position adjacent the pipeline guide, such that the auxiliary trolley is movable to a position adjacent the pipeline guide. This is in particular advantageous in embodiments having a displaceable pipeline guide.

In embodiments, one or more centralisers are provided to centralise the pipeline in the firing line. Commonly, the centralisers are provided below and adjacent to the one or more tensioners. In embodiments, the one or more centralisers are supported by the tensioner frame, below the tensioner tracks. It is also conceivable that the centralisers are supported directly by the pipeline launch tower. Optionally, the centralisers are supported directly by the tensioner rail, wherein the centralisers are also displaceable in the firing line, preferably also by the tensioner displacement drive.

Advantageously, the one or more centralisers are mounted movable to the tensioner frame or the pipeline launch tower, between an operational position wherein the centraliser is in the firing line, and a non-operational position wherein centraliser has moved away from the firing line. The cleared firing line is advantageous, e.g. in situations where an accessory is allowed to pass the tensioners. Advantageously, in embodiments with a trolley rail, the non-operational position of the centralizer also clears the trolley rail.

In embodiments, the centraliser is mounted pivotable to the tensioner frame, tensioner frame support assembly or pipeline launch tower about a horizontal centraliser pivot axis. The centraliser is pivotable between a horizontal operational position wherein the centraliser is in the firing line, and a non-operational vertical position wherein the firing line is cleared. It is both conceivable that the centraliser extends upwards, or downwards, in the vertical non-operational position.

In embodiments, a hoist beam is provided, supported by the lowermost tensioner frame below the tensioner tracks, and possibly below a centraliser. Optionally, the hoist beam is supported by a tensioner frame support assembly. In embodiments, a hoist beam support frame for a hoist beam is provided, supported by the lowermost tensioner frame below the tensioner tracks, and possibly below a centraliser. Optionally, the hoist beam support frame is supported by a tensioner frame support assembly. Advantageously, the hoist beam is movable along the hoist beam support frame in a horizontal plane, to and from the firing line. Optionally, a sideways movement past the pipeline launch tower is possible.

In embodiments, the hoist beam acts as accessory handling device, and is adapted to position the accessory in an accessory position in the firing line between the hang off device and the A&R sheave arrangement.

In embodiments, further equipment is also mounted to the tensioner frame or tensioner frame support assembly. For example a line-up tool may be mounted to the tensioner frame or tensioner frame support assembly, or accessory handling equipment.

Advantageously, a heave compensation system is provided, which is connectable to the one or more tensioner frames. Hence, the one or more tensioners are heave compensated, which is e.g. advantageous during lowering a construction such as a PLET or manifold with a pipeline, during connection of a pipeline to a construction, to compensate for sea state induced vessel motions and to compensate for inaccuracies in dynamic position in shallow waters.

According to the invention, a tensioner displacement drive is provided. In embodiments, the drive comprises a cable and winch, or alternatively a jackup leg system.

It is conceivable that the A&R cable and winch is applied as tensioner displacement drive. This requires the A&R cable to be alternately connected to the tensioner and to an accessory. E.g. in the method for providing an accessory at the trailing end of a pipeline, the A&R system is first applied to raise the tensioners to the upper accessory handling position, and subsequently used to lower the accessory.

In embodiments, the A&R cable extends from the A&R winch via the tensioner frame to an A&R sheave provided at an upper position in the firing line. When the position of the tensioner frame is fixed, the end of the A&R cable is movable in the firing line. In order to move the tensioner, the end of the A&R cable, e.g. a connector or hook, is hauled in adjacent a stop, as a result of which the tensioner frame will raise and lower upon actuation of the A&R winch.

It is noted that for A&R operations, the A&R cable extends in the firing line. However, during tensioner handling, the firing line should be kept free for the pipeline. E.g. in the method for launching a pipeline with an end connector at its leading end, the pipeline with the end connector is lowered in the firing line. In order to subsequently position the tensioners in the pipelaying position by the tensioner displacement drive, this drive cannot operate in the firing line, occupied by the pipeline. Hence, in order to use the A&R cable for this purpose, the path of the cable needs to be altered. This is commonly achieved by guiding the A&R wire via at least one A&R sheave the tensioner frame to the A&R sheave arrangement at an upper position in the firing line.

Yet alternatively, a separate dedicated tensioner displacement drive is provided. It is noted that in embodiments, this tensioner displacement drive does not only support the weight of the one or more tensioners, but also the weight of the launched pipeline, supported by the one or more tensioners. As indicated above, the large loads acting on the tensioners require a sturdy design of the tensioners, generally resulting in tensioners with a significant weight, e.g. several hundreds of tons. A single tensioner weighing 300 tons is common. In addition, during pipelaying, the tensioners support the weight of the launched pipeline in the firing line, which may add up to several hundreds of tons, e.g. 600 tons. Hence, the tensioner displacement drive should be well-dimensioned.

In embodiments, the pipeline launch tower and the tensioner frame are provided with cooperating position fixation devices, e.g. pins and slots, to fixate the tensioner with respect to the pipeline launch tower at least in the upper accessory handling position and the lower pipelaying position, and optionally also in a lowermost parking position, also referred to as end connector handling position. In view of this weight, it is advantageous that the tensioner displacement drive does not continuously have to support the tensioners, but that the weight can be transferred to the pipeline launch tower with the installation of the position fixation devices.

A second aspect of the present invention relates to a marine reel lay method pipeline installation vessel for laying on the seabed a pipeline and one or more accessories which are to be connected to the pipeline, forming a launched pipeline having a weight, wherein the vessel comprises:
one or more pipeline storage reels for storage of pipeline to be laid;
a pipeline launch tower mounted to the vessel, which pipeline launch tower is adapted to launch the pipeline in a firing line along said tower;
a pipeline guide which is supported at an elevated position by the pipeline launch tower, which pipeline guide is adapted to guide the pipeline from the storage reel over the pipeline guide into the firing line,
one or more tensioners, each tensioner comprising a tensioner frame supported by the pipeline launch tower and multiple tracks supported by said tensioner frame, said tracks being adapted to engage the pipeline and to support at least part of the weight of the launched pipeline in the firing line,
a hang off device supported in the lower part of the firing line, adapted to clamp and support the weight of the launched pipeline in the firing line;
an abandonment and recovery (A&R) system comprising at least one A&R winch and A&R cable, and an A&R sheave arrangement with one or more sheaves provided at an upper position in the firing line, said one or more sheaves being supported by the pipeline launch tower, adapted to raise, lower and support the weight of the launched pipeline in the firing line;
wherein the tensioner frame comprises two or more segments, comprising a first segment and at a second segment each including at least one track, wherein both the first and second segment are mounted pivotable about a vertical segment pivot axis to the pipeline launch tower, the segments being movable between a closed operational position wherein the segments are conjoined to form an enclosing pipeline annulus in which the tracks are adapted to engage the pipeline; and an open retracted position wherein the first and second segments are disconnected and separated, thereby creating a clear envelope in the firing line, further comprising a vertical trolley rail supported by the pipeline launch tower between the two vertical segment pivot axes, and an auxiliary trolley adapted to guide an accessory along the vertical trolley rail in the pipeline launch trajectory when the first and second segments are in the open retracted position.

Advantageously, the vertical trolley rail extends between a position below the tensioners, possibly below the hang off clamp, and a position adjacent the pipeline guide, such that the auxiliary trolley is movable from a position above the uppermost tensioner to a position below the lowermost tensioner. In embodiments wherein a moonpool is provided in the vessel, above which the pipeline launch tower is provided, the vertical trolley rail advantageously extends into the moonpool.

An advantage of such a marine reel lay method pipeline installation vessel according to the second aspect of the invention is that the auxiliary trolley and rail facilitates end connector handling. It is further advantageous during well intervention, e.g. if pipelaying is alternated by lowering special items. Another possible advantage of the presence of an auxiliary trolley and rail is that the pipeline launch tower may also be applied for pipelaying in a J-lay method.

It is noted that features relating to a certain aspect of the invention may also be applied in other aspects of the present invention.

The invention can be further explained in relation to the drawings, in which.

Figure 1A:
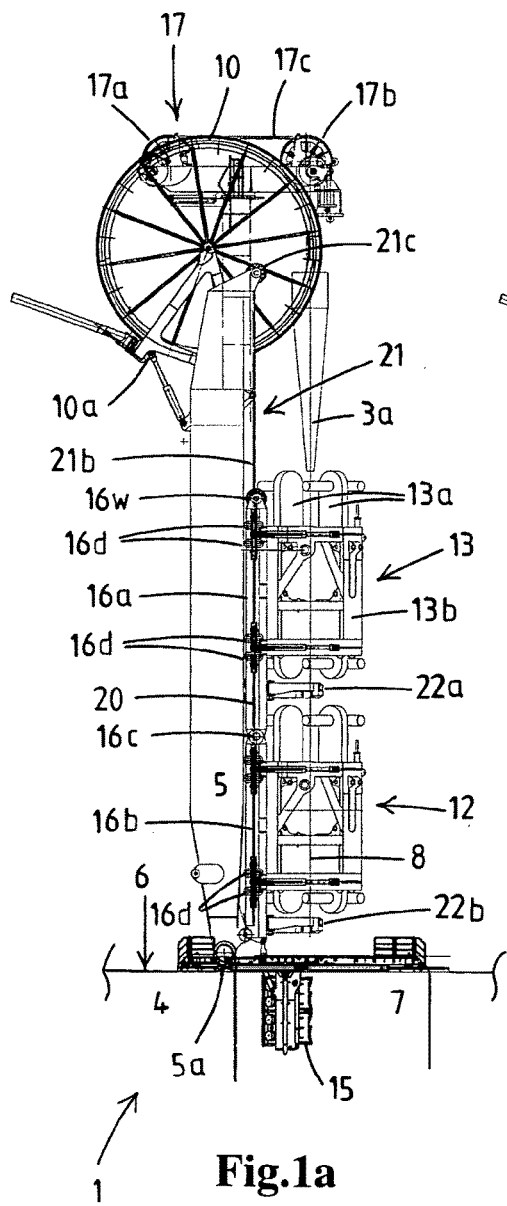
FIG. 1a represents a side view of a first embodiment of a marine reel lay method pipeline installation vessel with the tensioners in a lower parking position.
Figure 1B:
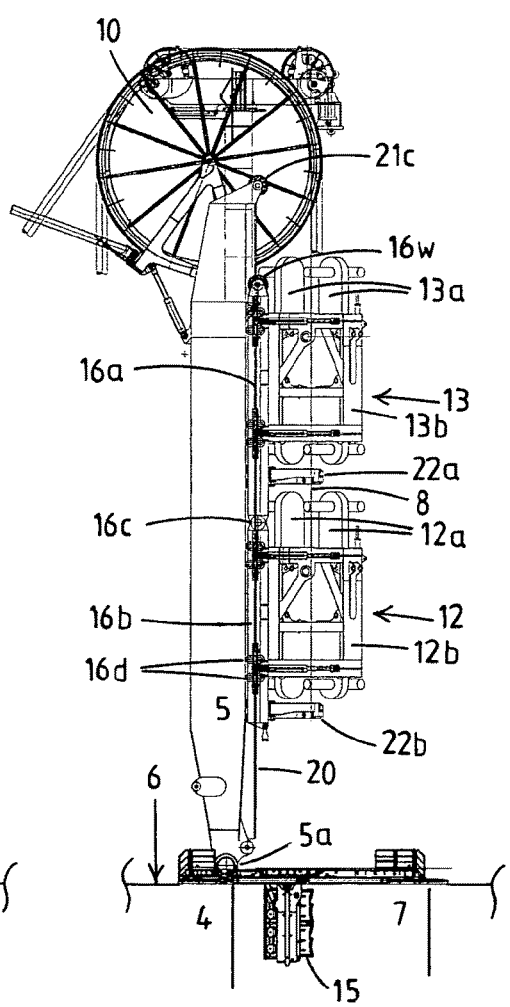
FIG. 1b represents a side view of the first embodiment of FIG. 1a with the tensioners in a pipelaying position.
Figure 1C:
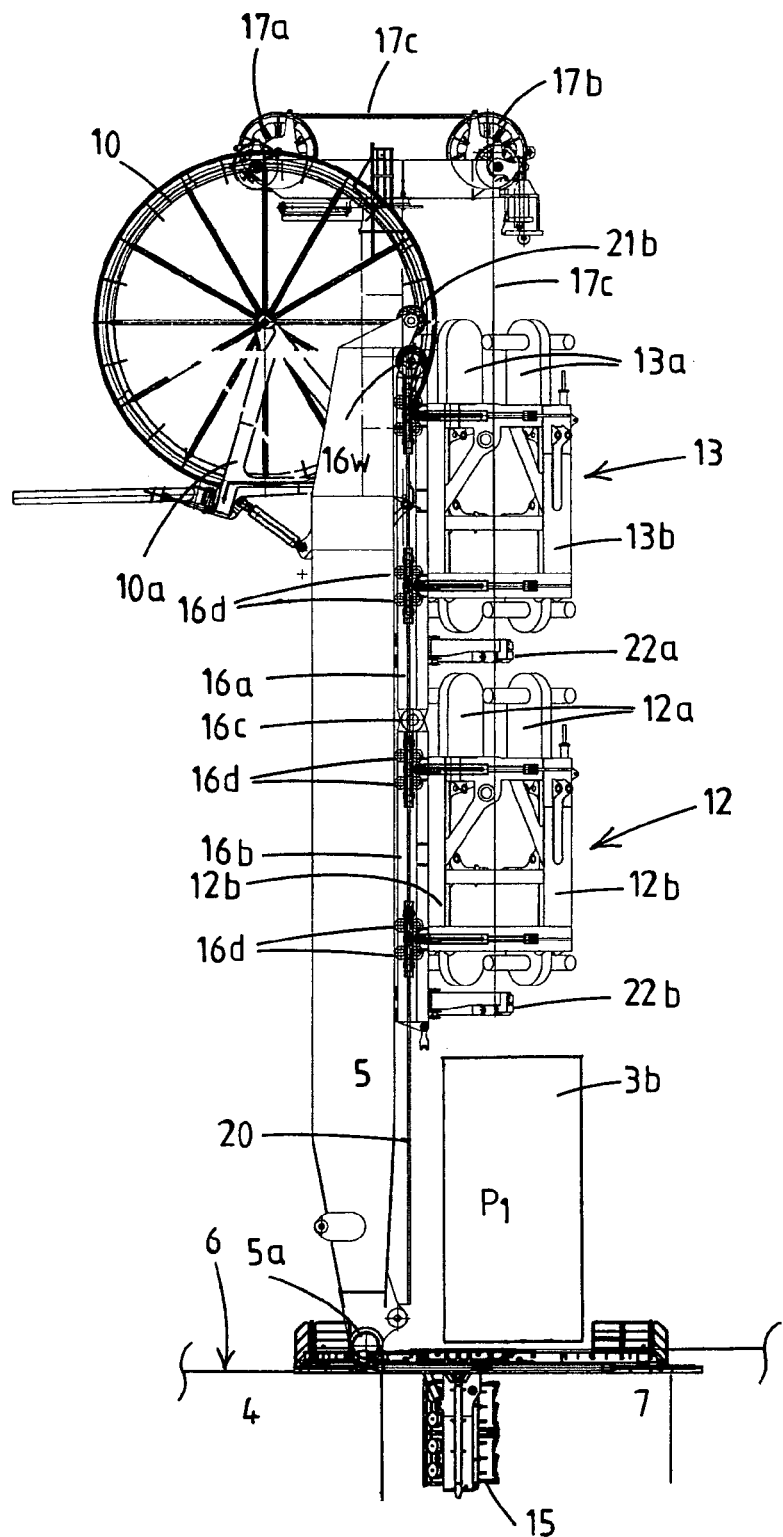
FIG. 1c represents a side view of the first embodiment of FIG. 1a with the tensioners in a an upper accessory handling position.
Figure 2A:
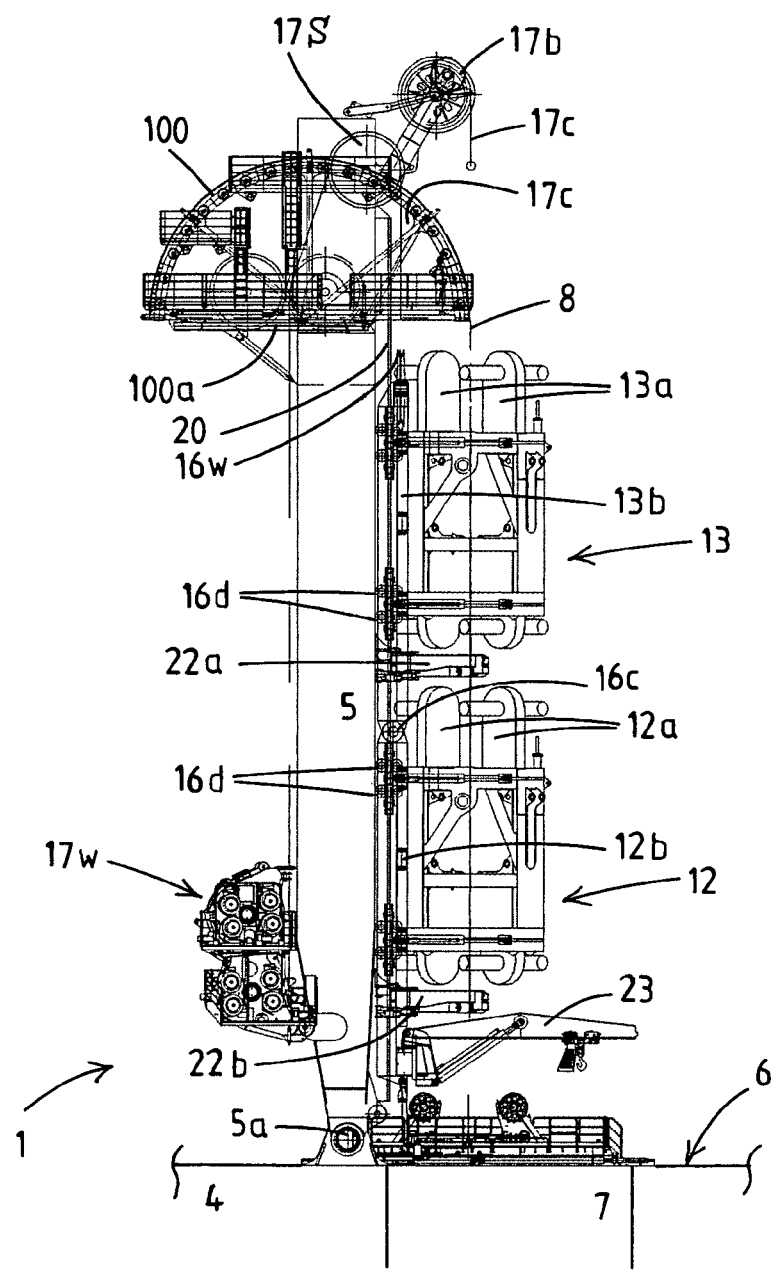
FIG. 2a represents a side view of a second embodiment of a marine reel lay method pipeline installation vessel with the tensioners in a pipelaying position.
Figures 2B, 2C:
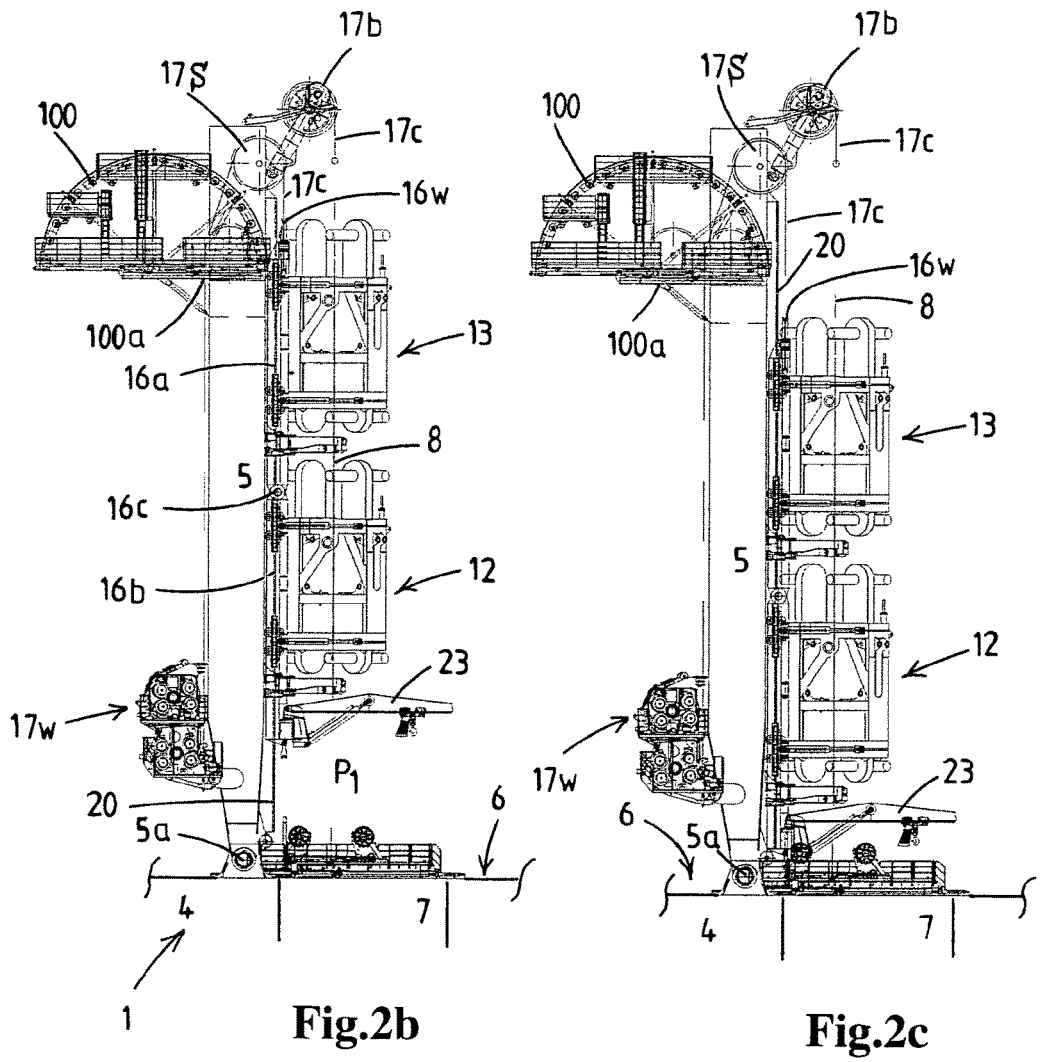
FIG. 2b represents a side view of the second embodiment of FIG. 2a with the tensioners in an upper accessory handling position.
FIG. 2c represents a side view of the second embodiment of FIG. 2a with the tensioners in a lower parking position.
Figure 3A:
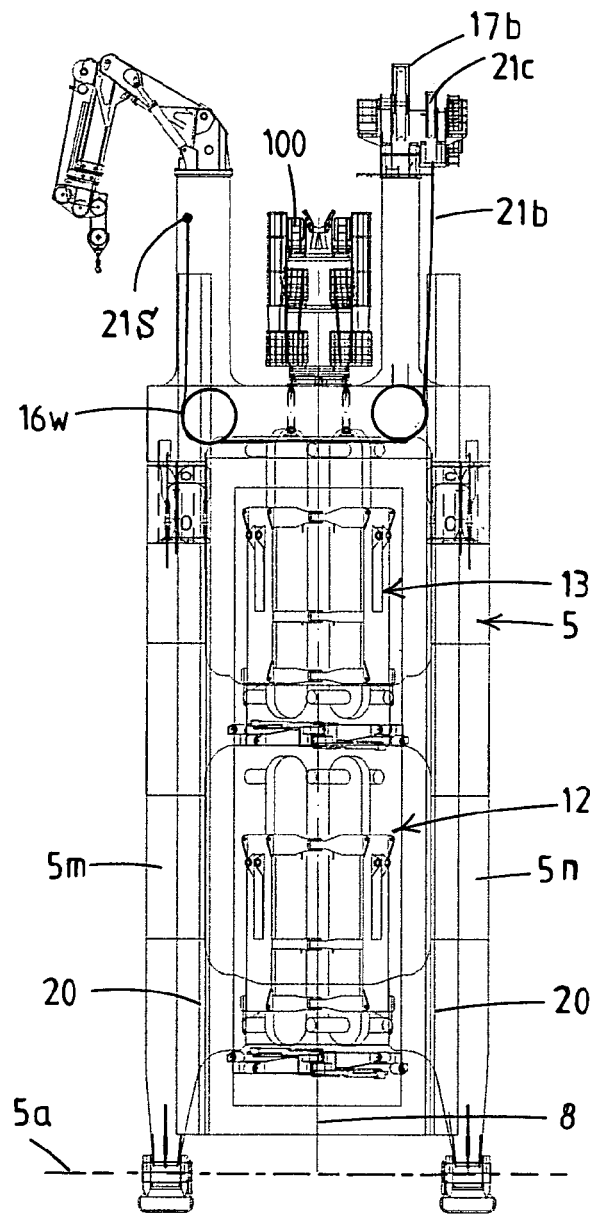
FIG. 3a represents a view from behind on the second embodiment of FIGS. 2a-2c, in which the tensioner displacement drive is indicated.
Figure 3B:
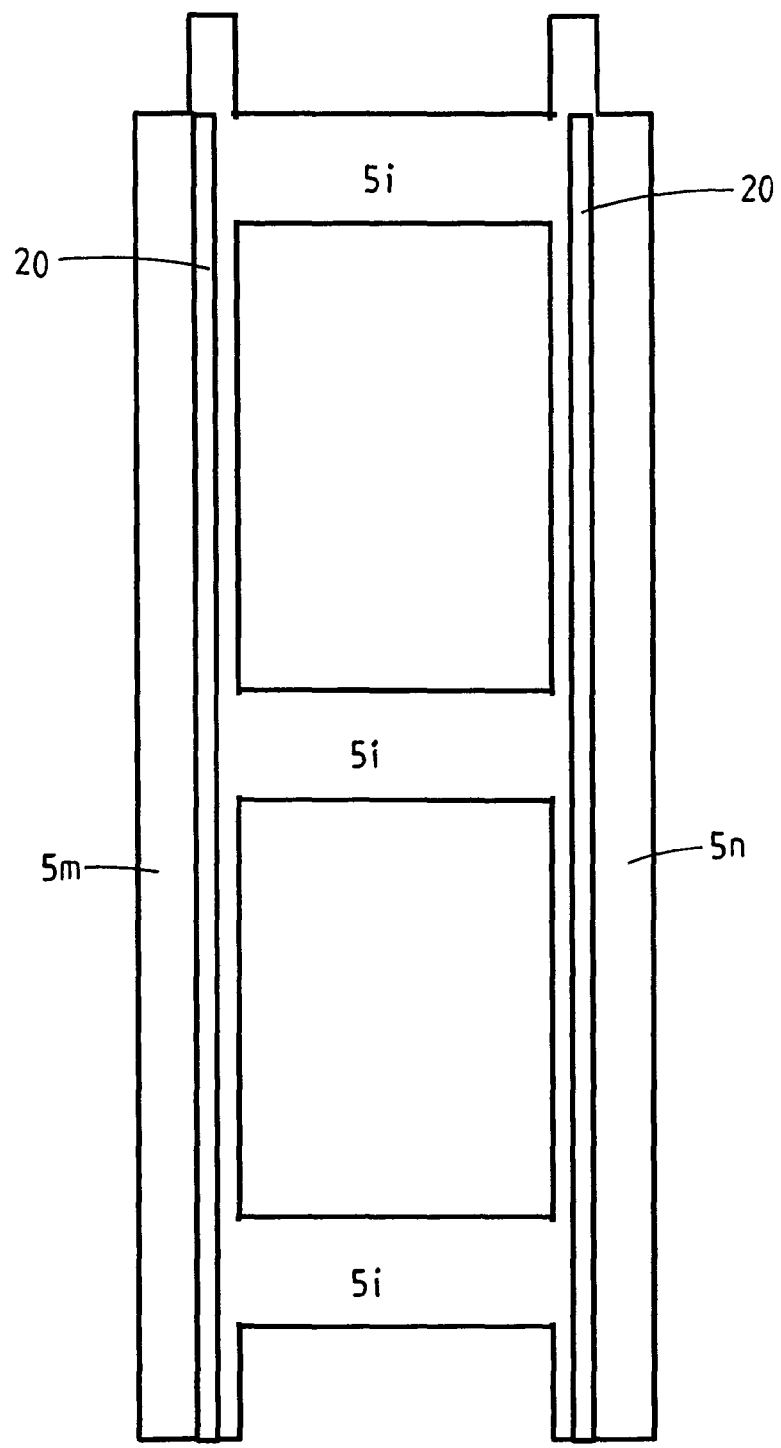
FIG. 3b represents a schematical view on the pipeline launch tower.

In FIGS. 1a-1c a first embodiment of a marine reel lay method pipeline installation vessel 1 for laying on the seabed a pipeline 2 and one or more accessories 3a, 3b which are to be connected to the pipeline, forming a launched pipeline having a weight, is shown in a side view. In FIGS. 2-2c and FIG. 3a a second embodiment is shown in a side view, in FIGS. 3b and 3c schematical views and in FIGS. 4a-4c a top view is shown. Same parts are indicated with same reference numerals.

The shown embodiments of vessel 1 comprise a hull 4 into which a moonpool 7 is provided. In the hull 4, or on deck 6, one or more pipeline storage reels as known per se, not shown in the drawings, for storage of pipeline to be laid are preferably provided.

Adjacent to the moonpool 7 a pipeline launch tower 5 is mounted pivotably to the deck 6 of the vessel about pivot axis 5a, which pipeline launch tower is adapted to launch the pipeline in a firing line 8 along said tower. The pipeline launch tower 5 comprises two parallel vertical leg members 5m and 5n, as visible in particular in FIGS. 3a, 3b and 4a-c, here interconnected via beams 5i. It is noted that an advantage of the invention is that the design flexibility regarding the position of the beams is increased, as this is not linked to the position of the tensioners. Hence, the lower beam 5i may be at an elevated position, allowing accessories to move below this lower beam 5i.

In the lower part of the firing line 8, here in the moonpool 7, a hang off device 15 is provided (only shown in FIGS. 1a-1c), here supported by the hull 4 of the vessel, adapted to clamp and support the weight of the launched pipeline in the firing line.

A pipeline guide 10 is in FIGS. 1a-1c embodied as an aligner wheel, and in FIGS. 2a-2c and 3 as a semi-circular guide 100. Both aligner wheel 10 and semi-circular guide 100 are supported via a guide frame 10a, 100a, at an elevated position by the pipeline launch tower 5.

The vessel 1 is furthermore provided with an abandonment and recovery (A&R) system 17. In the embodiment of FIGS. 2a-2c, an A&R winch 17w is visible, not visible in the embodiment of FIGS. 1a-1c, from which an A&R cable 17c extends over an A&R sheave arrangement with one or more sheaves 17a, 17b, being supported by the pipeline launch tower 5, being adapted to raise, lower and support the weight of the launched pipeline in the firing line 8. Sheave 17b is provided at an upper position in the firing line 8. It is noted that in FIG. 3a, the sheave 17b of the A&R system is provided at a distance from the firing line 8, which is quite common as the sheave is mounted movable to the upper end of the pipeline launch tower.

On the vessel an accessory handling device is provided, not shown, which is adapted to position the accessory in an accessory position P1 in a lower part of the firing line between the hang off device 15 and the A&R sheave arrangement. This is visible in FIGS. 1c and 2b. The accessory handling device can be embodied as a dedicated accessory loader, but can also be a conventional deck crane, e.g. a mast crane, knuckle boom or gantry crane, that is adapted to operate in a lower part of the firing line 8.

Figure 3C:
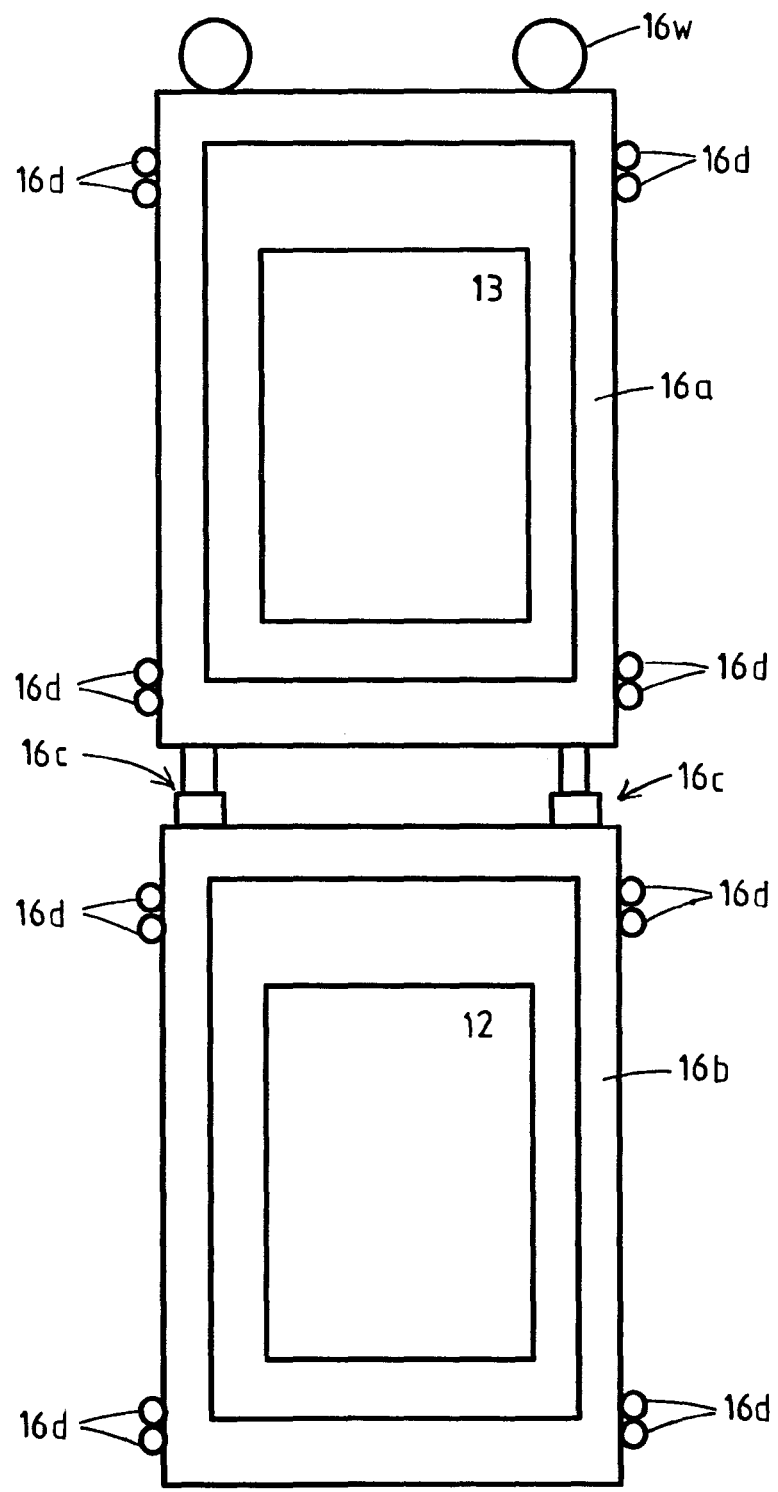
FIG. 3c represents a schematical view on the tensioner frame support assembly with the tensioners.

In the shown embodiments, the vessel 1 furthermore comprises two tensioners 12, 13, an upper tensioner 13 and a lower tensioner 12, each tensioner comprising a tensioner frame 12b, 13b supported by the pipeline launch tower 5 via a tensioner frame support assembly 16a, 16b. The tensioner frames 12b, 13b each support multiple, here four tracks 12a, 13a, said tracks being adapted to engage the pipeline and to support at least part of the weight of the launched pipeline in the firing line 8. The tensioner frame support assembly 16b of the lower tensioner 12 is supported by the tensioner frame support assembly 16a of the upper tensioner 13, here via a pin 16c. In FIG. 3c, the tensioner frame support assemblies 16a, 16b, with tensioners 12, 13 is schematically shown.

According to the present invention, the tensioner frame support assemblies 16a, 16b are displaceable supported by a tensioner rail 20 which is mounted to the pipeline launch tower 5, extending parallel to the firing line 8, allowing the tensioners 12, 13 to be displaceable in the firing line, along the pipeline launch tower. Here, the tensioner rail is embodied as a pair of rails 20, mounted to each vertical leg 5m, 5n of the pipeline launch tower, extending over essentially the entire length of the tower 5. The tensioner frame support assemblies 16a, 16b are provided with wheels 16d engaging on the rail 20. In the top view of FIG. 4a three wheels 16d are visible, supported by the tensioner frame support assembly 16a, that engage a rail 20.

In FIGS. 1a-1c, a separate tensioner displacement drive 21 is provided to support and displace the tensioners 12, 13. The tensioner displacement drive 21 of the shown embodiments in particular comprises a winch, not visible, a cable 21b and sheaves 21c. The tensioner displacement cable 21b engages sheaves 16w on the tensioner frame support assembly 16a of the upper tensioner 13, in order to displace the tensioners. As visible in FIG. 3a, in the shown embodiment, an end of cable 21b engages a stop 21s.

In FIGS. 2a-2c, the A&R system 17 is applied as tensioner displacement drive. From A&R winch 17w the A&R cable 17c extends via sheave 17s to sheave 16w on the tensioner frame support assembly 16a of the upper tensioner 13, and then to sheave 17b provided at an upper position in the firing line 8. When the position of the tensioner frame is fixed, the end of the A&R cable is movable in the firing line. In order to move the tensioner, the end of the A&R cable, e.g. a connector or hook, is hauled in adjacent a stop, as a result of which the tensioner frame will raise and lower upon actuation of the A&R winch.

The displacement of the tensioners 12, 13 is apparent when comparing FIGS. 1a, 1b, 1c, and 2a, 2b and 2c. In FIG. 1c and FIG. 2b, the tensioners are shown in an upper accessory handling position wherein the one or more tensioners have moved above the accessory position P1. In this position, the tensioners allow passage of the A&R cable, to be able to handle the large accessory 3b in the firing line. The shown accessory 3b is e.g. a PLET, a pipeline end termination.

In FIGS. 1b and 2a, the tensioners are at an intermediate pipelaying position, in which the tensioners are adapted to engage and lower pipeline 2.

In FIGS. 1a and 2c the tensioners are at a lowermost parking position wherein the one or more tensioners have moved to a position close to the hang off device 15. It is conceivable that the tensioners are parked in this position for transport, but, as visible in FIG. 1a, this lowermost position is also suitable to handle accessories such as end connectors 3a, which are possibly provided at leading and/or trailing ends of a pipeline, and which are introduced in the firing line from above, e.g. being guided or hoisted over the guide wheel 10. In the shown embodiments, the distance between the upper accessory handling position and the lowermost parking position is about 10 meters.

In the shown embodiments, further two centralisers 22a, 22b are provided, adapted to centralise the pipeline in the firing line 8. Centraliser 22a is supported by the tensioner frame support assembly 16a of the upper tensioner, below the tensioner tracks 13a, and centraliser 22b is supported by the tensioner frame support assembly 16b of the lower tensioner 13, below the tensioner tracks 13a.

In the embodiment shown in FIGS. 2a-2c, also a hoist beam 23 is provided, which is supported by the tensioner frame support assembly 16b of the lower tensioner 13, below the tensioner tracks 13a and below the centraliser 22b. The hoist beam 23 is advantageously provided for performing hoisting operations in and adjacent the firing line, e.g. for tool handling, positioning accessories, mutually connecting pipelines, handling a yoke which may be required for A&R, and the connection of accessories.

In the embodiments, the construction of the tensioner frame being supported by a tensioner frame support assembly allows the tensioners to be opened, thereby creating a clear envelope in the firing line. This construction is shown in detail in FIGS. 4a-4c.

Figure 4A:
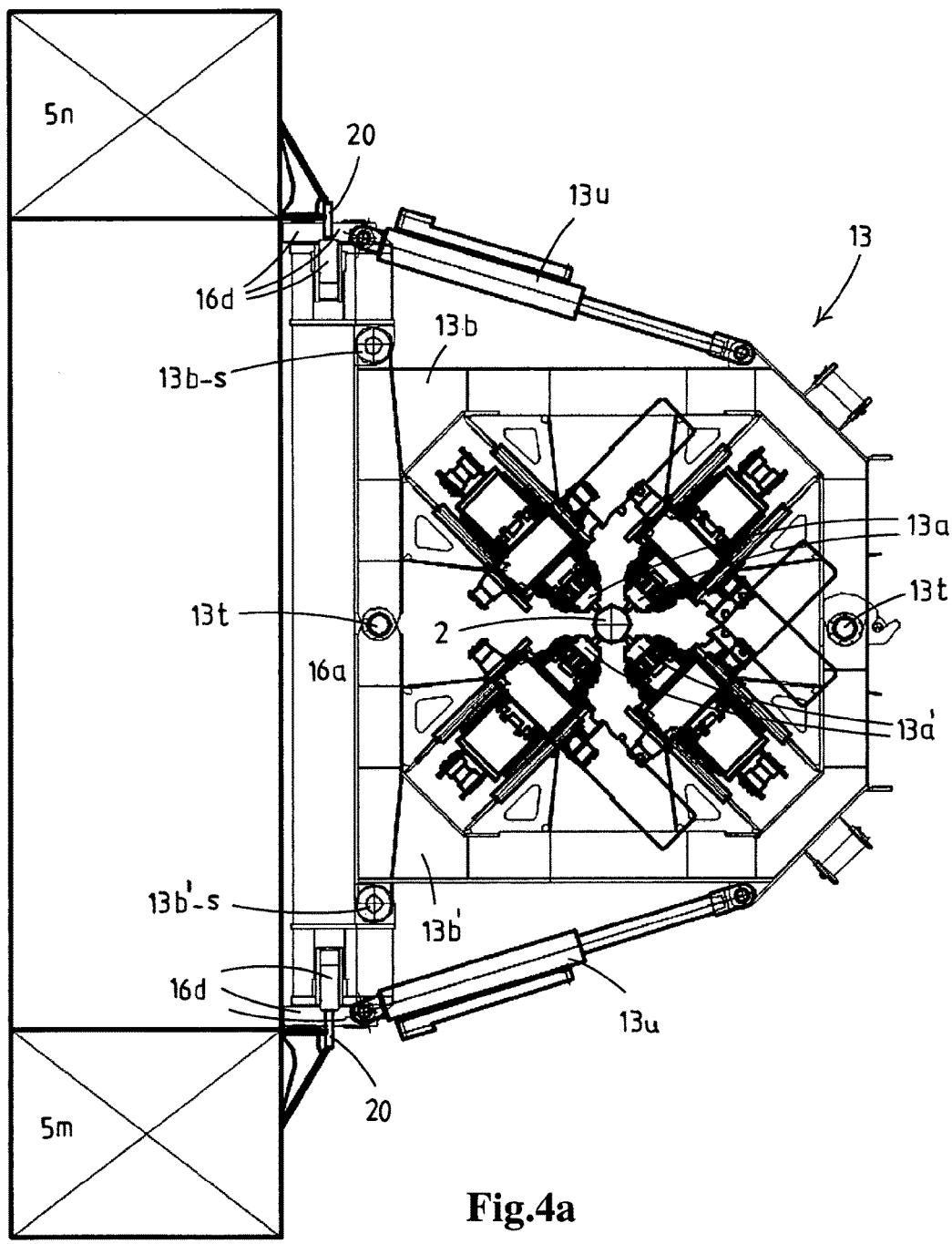
FIG. 4a represents a top view of a preferred embodiment of a marine reel lay method pipeline installation vessel with the tensioners in a closed operational position.
Figure 4B:
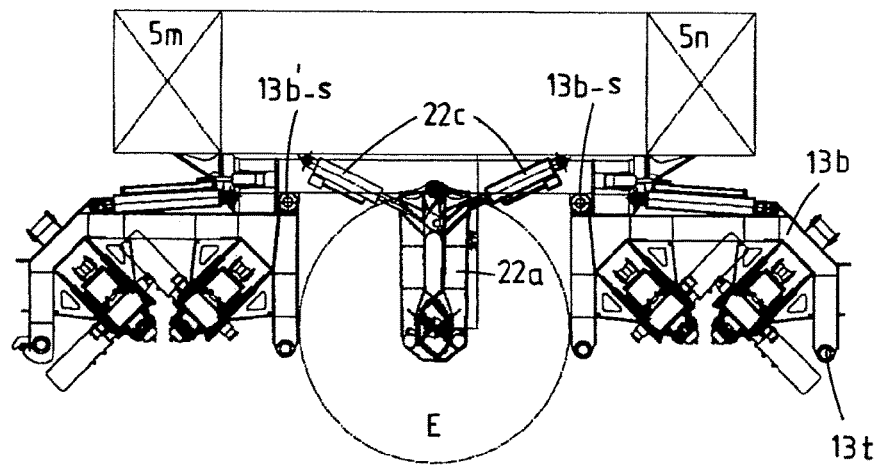
FIG. 4b represents a top view of the embodiment of FIG. 4a with the tensioners in an open retracted position and with a centraliser in a non-operational vertical position.
Figure 4C:
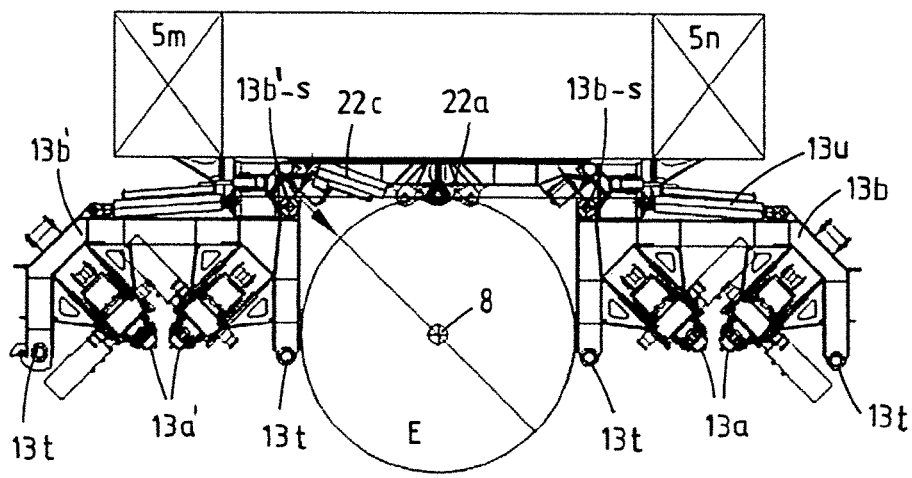
FIG. 4c represents a top view of the embodiment of FIG. 4a with the tensioners in an open retracted position and with a centraliser in a horizontal operational position.

Tensioner 13 is shown, supported by tensioner frame support assembly 16a, which is displaceable supported via wheels 16d by rails 20. Tensioner 13 comprises a tensioner frame, comprising two segments 13b and 13b'. First segment 13b includes two tensioner tracks 13a, and second segment 13b' includes two tensioner tracks 13a'. Both the first 13b and second segment 13b' are mounted pivotable about a vertical segment pivot axis 13b-s and 13b'-s to the tensioner frame support assembly 16a. In FIG. 4a, the segments are shown in a closed operational position wherein the segments 16b, 16b' are conjoined at contact points 16t to form an enclosing pipeline annulus in which the tracks are adapted to engage a pipeline 2. In FIGS. 4b and 4c, the segments 13b, 13b' are shown in an open retracted position wherein the first and second segments are disconnected at contact points 13t and separated by cylinders 13u, thereby creating a clear envelope E in and adjacent the firing line 8. It is noted that contact point 13t at the left hand part of FIG. 4a may be dispensed with: it is conceivable that the segments are only interconnected at a contact point 13t at the right hand side of the drawing, i.e. remote from the pipeline launch tower.

From FIGS. 4b and 4c, it is derivable that also centraliser 22a is mounted movable to the tensioner frame, here to the tensioner frame support assembly 16a, here by cylinders 22c, between a horizontal operational position wherein the centraliser is in the firing line, as shown in FIGS. 1a-1c and in FIG. 4b, and a non-operational vertical position wherein the firing line 8 is cleared, as shown in FIG. 4c.

Figure 5A:
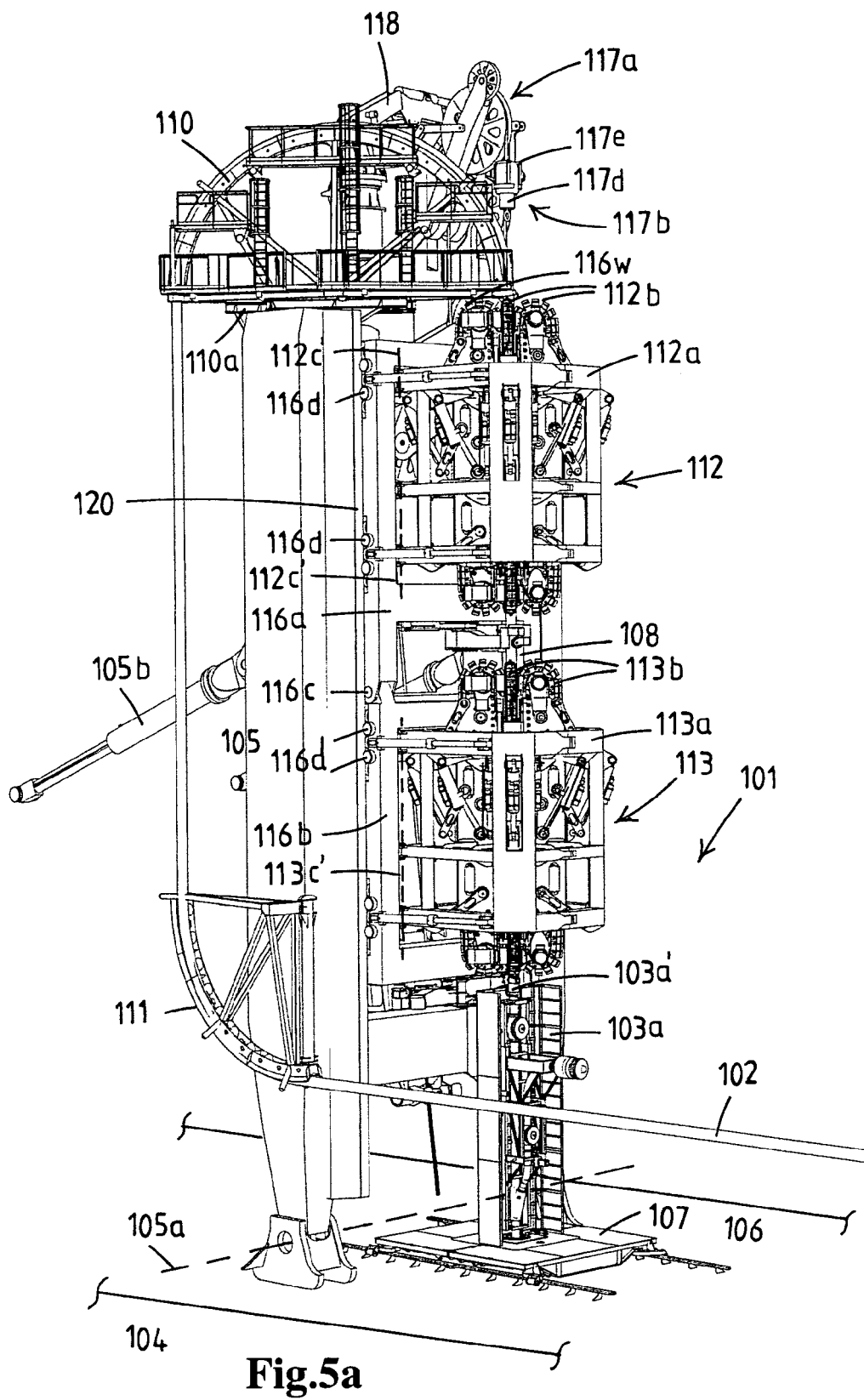
FIG. 5a represents a perspective view of a third embodiment of a marine reel lay method pipeline installation vessel with the tensioners in the upper accessory handling position.
Figure 5B:
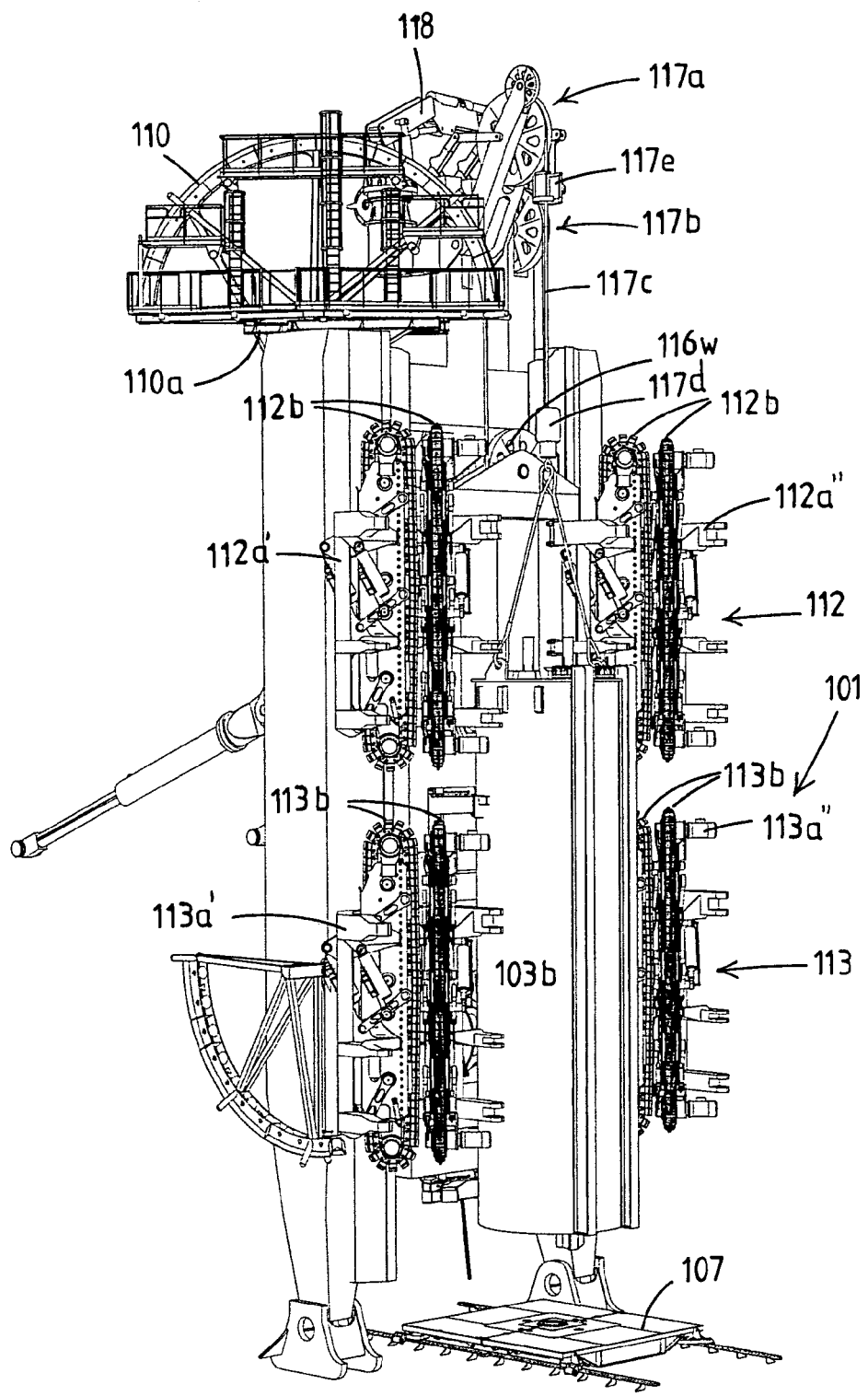
FIG. 5b represents a perspective view of the third embodiment of FIG. 5a with the tensioners in the pipelaying position and in an open retracted position.
Figure 5C:
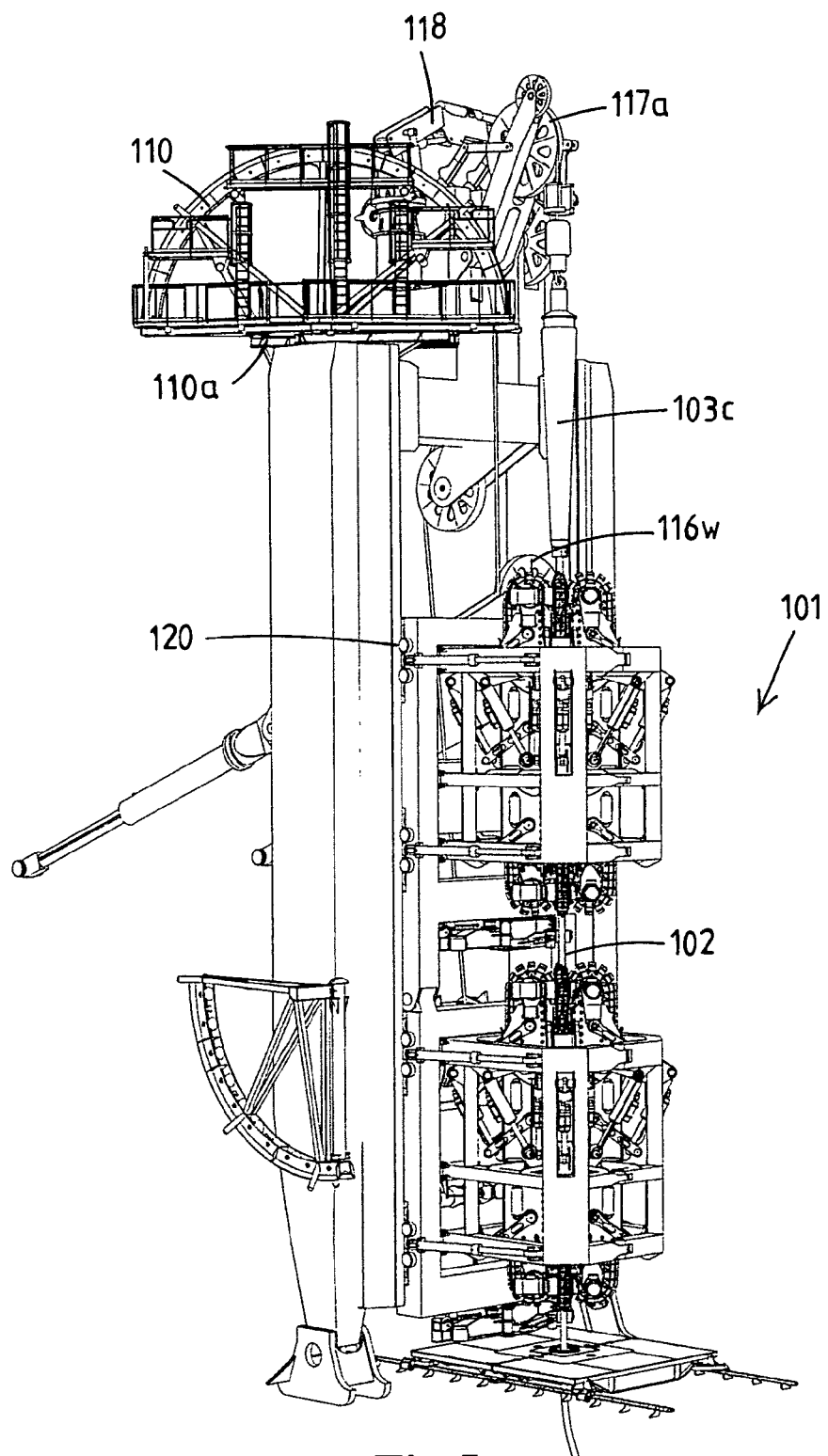
FIG. 5c represents a perspective view of the third embodiment of FIG. 5a with the tensioners in the parking position, here an end connector handling position.

In FIGS. 5a-c a third embodiment of a marine reel lay method pipeline installation vessel 101 for laying on the seabed a pipeline 102 and one or more accessories 103a, 103b and 103c are shown in a perspective view. Accessory 103a in FIG. 5a is embodied as a PLET, a pipeline end termination, which is here connected at the trailing end of pipeline 102. Accessory 103b in FIG. 5b is embodied as a SLOR (Single Line Offset Riser) or COR (Concentric Offset Riser), which is a very large accessory to be connected to a pipeline. Accessory 103c in FIG. 5c is embodied as a trailing end connector, provided at the trailing end of a flexible pipeline.

The marine reel lay method pipeline installation vessel 101 comprises a hull 104 and a deck 106. In the hull a moonpool is provided, covered at deck level by moonpool hatches 107. At the righthand side of FIG. 5a a pipeline storage reel is provided, not visible, for the storage of pipeline 102. Below the moonpool hatches 107, or possibly integrated with the moonpool hatches 107, is a hang off device, adapted to clamp and support the weight of the launched pipeline in the firing line.

Adjacent the moonpool a pipeline launch tower 105 is mounted pivotably to the deck 106 via pivot axis 105a, which pipeline launch tower is adapted to launch the pipeline in a firing line 108 along said tower through the moonpool and into the sea. Adjusters 105b are provided to fix the pipeline launch tower in a pivoted position. In FIGS. 5a-5c, the pipeline launch tower is not tilted.

In the shown embodiment, a pipeline chute 111 is provided at a lower part of the pipeline launch tower 105 to guide the pipeline 102 from the storage to an upper part of the tower. A semi-circular pipeline guide 110 is provided at the upper part of the pipeline launch tower, supported by a guide frame 110a. The pipeline guide 110 is adapted to guide the pipeline from the storage reel over the pipeline launch tower 105 into the firing line 108, as visible in FIG. 5a.

The guide frame 110a enables displacement of the pipeline guide 110 between a pipelaying position as visible in FIG. 5a and a retracted, non-operable position wherein the pipeline guide 110 has moved away from the firing line 108, as visible in FIGS. 5b and 5c.

At the upper end of the pipeline launch tower 105, an A&R sheave assembly comprising sheaves 117a, 117b, 117c is provided, which are part of an A&R system further comprising a winch (not shown) and an A&R cable 117c, visible in FIG. 5b, which is adapted to raise, lower and support the weight of the launched pipeline in the firing line 108. In FIG. 5b, the A&R cable 117c is used to lower accessory 103b in the firing line. At the end of the A&R cable 117c a connector or hook 117d is provided.

In the shown embodiment, the vessel comprises two tensioners 112, 113. Upper tensioner 112 comprises a tensioner frame 112a supporting four tracks 112b, and lower tensioner 113 comprises a tensioner frame 113a supporting four tracks 113b, said tracks being adapted to engage the pipeline and to support at least part of the weight of the launched pipeline in the firing line.

Tensioner frames 112a, 113a are displaceable supported by a tensioner rail 120 which is mounted to the pipeline launch tower 105, parallel to the firing line 108. In the shown embodiments, the rails 120 extend over the entire length of the tower 105, allowing the tensioners to be displaceble in the firing line. The tensioner frame support assemblies 116a, 116b are provided with wheels 116d engaging on the rail 120.

The tensioners are positionable in an upper accessory handling position, as visible in FIG. 5a, wherein the tensioners have moved above the accessory position, in which accessory 103a is provided in FIG. 5a. The tensioners are also allowed to be positioned in a pipelaying position, as visible in FIG. 5b, wherein the tensioners at least partially overlap the accessory position of accessory 103a of FIG. 5a. In FIG. 5c, it is visible that the tensioners may also be positioned at a lowermost parking position, wherein the tensioners have moved below an end connector entry position, wherein end connector 103c is provided in this FIG. 5c.

In the shown embodiment, tensioner frames 112a, 113a are displaceable supported by a tensioner rail 120 via tensioner frame support assemblies 116a, 116b respectively. The tensioner frame support assembly 116b of the lower tensioner 113 is supported by the tensioner frame support assembly 116a of the upper tensioner 112 via a pin 116c.

The tensioner frames 112a, 113a of the shown embodiment comprise two segments 112a' and 112a", and 113a' and 113a" respectively. The segments each comprise two tracks. The segments 112a' and 112a" and 113a' and 113a" respectively are each mounted pivotable about a vertical segment pivot axis. In FIG. 5a, the vertical segment pivot axis 112c' of segment 112a' and vertical segment pivot axis 113c' of segment 113a' is visible.

The segments 112a' and 112a" and 113a' and 113a" respectively are movable between a closed operational position, as visible in FIG. 5a and FIG. 5c, wherein the segments are conjoined to form an enclosing pipeline annulus in which the tracks 112b, 113b are adapted to engage the pipeline, and an open retracted position, as visible in FIG. 5b, wherein the first and second segments are disconnected and separated, thereby creating a clear envelope in the firing line. In the embodiment of FIG. 5b, the clear envelope is occupied by the accessory 103b.

Furthermore, on the vessel an accessory handling device is provided which is not shown. This may e.g. be embodied as a crane, e.g. a knuckleboom crane, provided on deck. It is also well known to provide a hoist beam at the tower to introduce accessories into the firing line.

In FIG. 5a, the accessory handling device has positioned accessory 103a in an accessory position in the firing line adjacent the moonpool hatches 107, adjacent the hang off device.

In FIG. 5b, the accessory handling device, here presumably a crane, has positioned accessory 103b in the firing line above the moonpool hatches 107, partially overlapping the closed operational position of the tensioners.

In FIG. 5c, the accessory handling device, here e.g. knuckleboom crane 118 also provided at the top of the pipeline launch tower 105, has positioned an end connector in an end connector entry position in the firing line above the one or more tensioners.

In the embodiment of FIGS. 5a-5c, the A&R system 117 is applied as tensioner displacement drive. The A&R cable extends via sheave 117b to a sheave 116w on the tensioner frame support assembly 116a of the upper tensioner 112 to the sheave 117a provided at an upper position in the firing line. When the position of the tensioner frame is fixed, the end of the A&R cable is movable in the firing line, as visible in FIGS. 5b and 5c. In order to move the tensioners, the end of the A&R cable 117c, here a connector 117d, is hauled in adjacent a stop 117e, as a result of which the tensioner frames 116a, 16b will raise and lower upon actuation of the A&R winch.

In the situation visible in FIG. 5a, an accessory 103a, here with a pipe end 103a' at an upper end thereof is provided at the leading end of a pipeline 102. Prior to be able to position the accessory 113a, the tensioners 112, 113 were positioned in the upper accessory handling position by the tensioner displacement drive, here the A&R system. The shown method further comprises the steps of:

positioning the accessory in the accessory position in the firing line by the accessory handling device;
launching a pipeline via pipeline guide into the firing line, the tracks of the tensioners engaging the pipeline;
connecting the pipeline to the accessory, here to the pipe end 103a' of the accessory 103a;
lowering the pipeline and the accessory connected thereto by the tensioners until the pipe end of the accessory or the pipeline has reached the hang off device;
supporting the pipeline or the pipe end of the accessory by the hang off device;
increasing the gap between the tensioner tracks in the tensioner;
positioning the tensioners in the pipelaying position by the tensioner displacement drive, here the A&R system;
decreasing the gap between the tensioner tracks in the tensioner;
disconnecting the hang off device, and
laying the pipeline with the accessory.

In FIG. 5b, the lowering or a large accessory 103b by the A&R system in the firing line 108 is shown. Possibly, a pipeline is connected to the accessory 103b, which may be engaged by the tensioners 112, 113 once the segments are conjoined after the passage of accessory 103b.

In FIG. 5c, a pipeline 102 is lowered with an end connector at its trailing end. Prior to the situation of FIG. 5c, the pipeline 102 was laid with the tensioners in the pipeline engagement position (segments conjoined) and in the pipelaying position, intermediate the parking position and the upper accessory handling position. Subsequently, the tensioners, while engaging the pipeline, are positioned in a lowermost parking position by the tensioner displacement drive. Alternatively, it is conceivable that the pipeline was held by the hang off device and the tensioner tracks opened while lowering the tensioners to the parking position. Once the tensioners are in the parking position, the tensioner tracks are closed to engage the pipeline and the hang off device is disconnected. Pipelaying is continued, and the end connector is allowed to enter the end connector entry position in the firing line by the end connector handling device, as visible in FIG. 5c. Prior to or after entering the firing line, the end connector 103c is connected to the A&R system. Hereafter the one or more tensioners are positioned in the accessory passage position and the end connector and the pipeline connected thereto are lowered by the A&R system past the one or more tensioners.

Figure 5D:
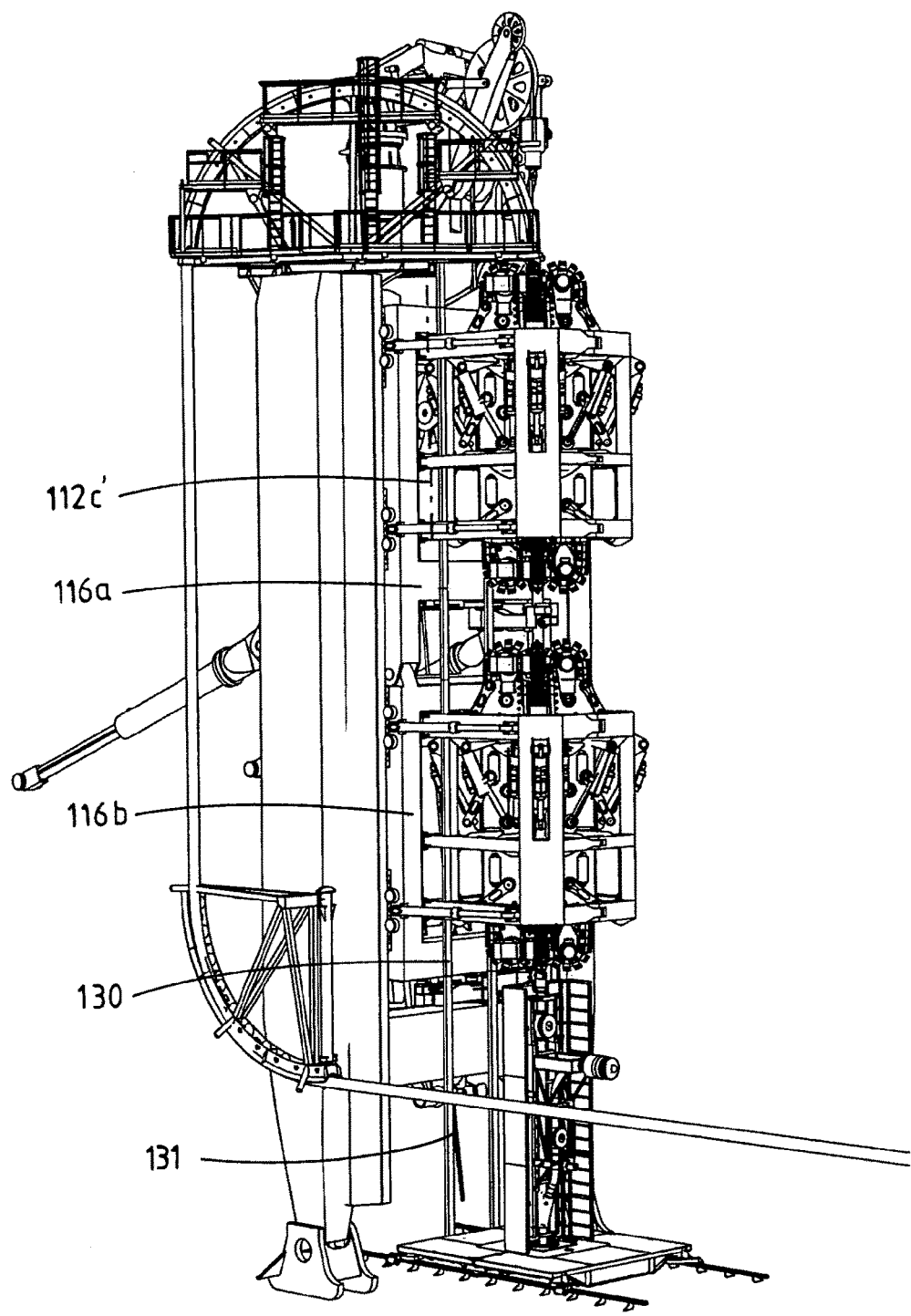
FIG. 5d represents a perspective view of a fourth embodiment of a marine reel lay method pipeline installation vessel with the tensioners in the upper accessory handling position including a vertical trolley rail.

In FIG. 5d a fourth embodiment of a marine reel lay method pipeline installation vessel with the tensioners in the upper accessory handling position is shown, very similar to the embodiment of FIG. 5a. However, in the fourth embodiment shown in FIG. 5d a vertical trolley rail 130 is provided. The vertical trolley rail is supported by the tensioner frame support assembly 116a, 116b between the two vertical segment pivot axes. An auxiliary trolley (not shown) may be provided, which is adapted to guide an accessory along the vertical trolley rail in the pipeline launch trajectory when the first and second segments are in the open retracted position. In the shown embodiment, the trolley rail extends over the entire length of the tensioner frames. In the shown embodiment, a vertical trolley rail segment 131 is provided in line with the vertical trolley rail 130 below the tensioners adjacent the accessory position, here extending until a position below the hang off device, even into the moonpool, such that the auxiliary trolley is movable to a position below the lowermost tensioner.

Figure 6A:
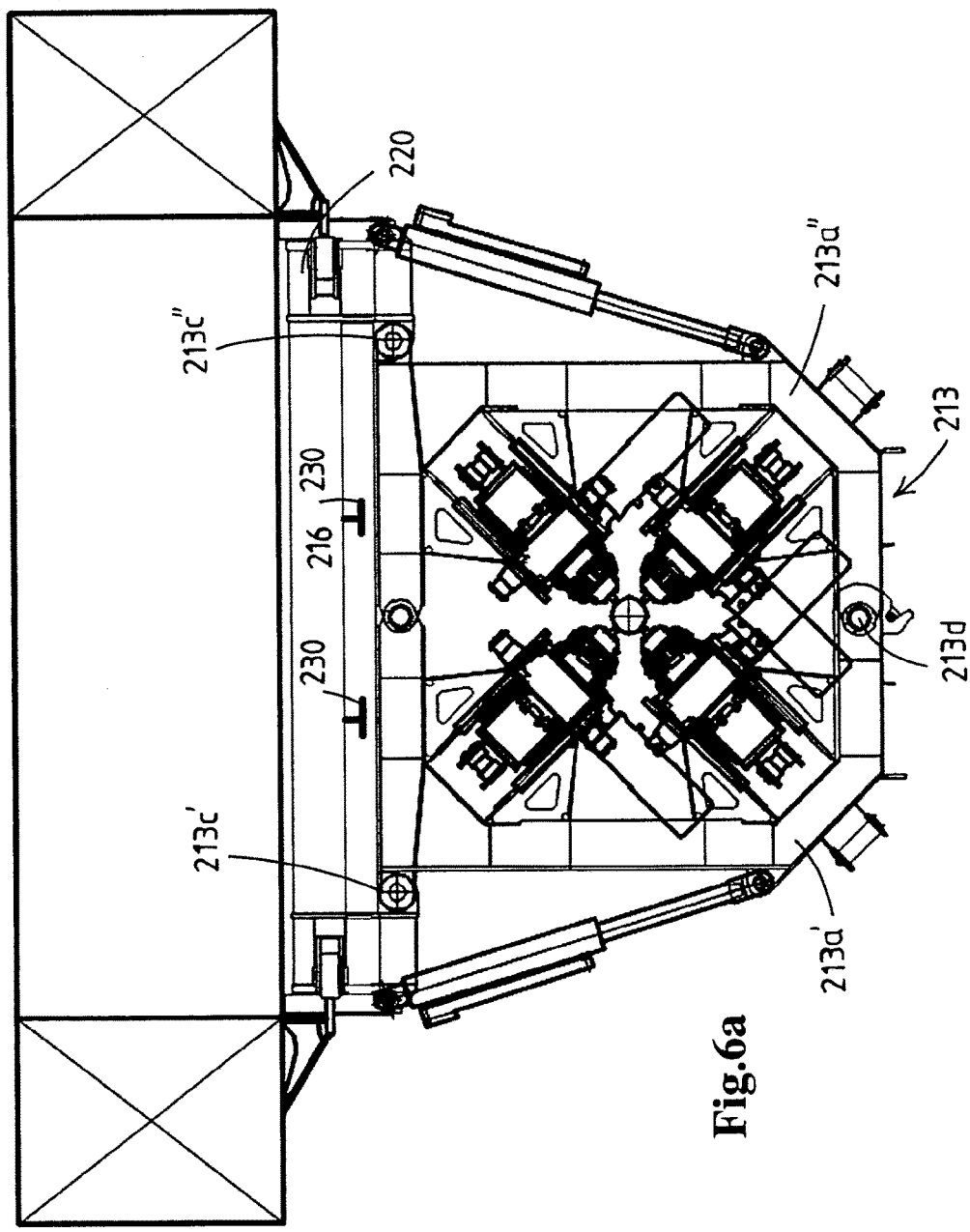
FIG. 6a represents a top view of a fourth embodiment of a marine reel lay method pipeline installation vessel comprising a trolley rail with the tensioners in a closed operational position.
Figure 6B:
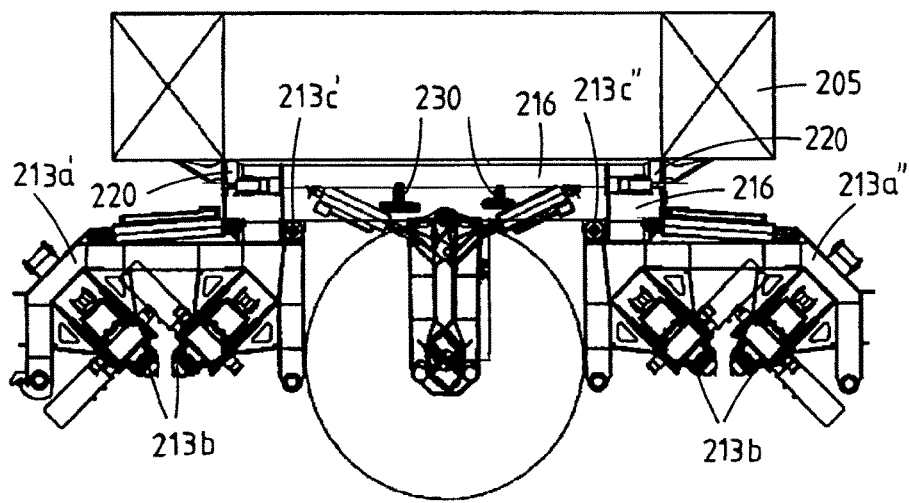
FIG. 6b represents a top view of the embodiment of FIG. 6a with the tensioners in an open retracted position and with a centraliser in a non-operational vertical position.

In FIGS. 6a and 6b top views of a fourth embodiment of a marine reel lay method pipeline installation vessel comprising a trolley rail are shown, similar to the top views of FIGS. 4a and 4b. In the shown embodiments, the tensioner is in a closed operational position in FIG. 6a and an open retracted position (with a centraliser in a non-operational vertical position) in FIG. 6b.

The tensioner frame 213 comprises two segments 213a' and 213a" each including two tracks 213b. Both the first and second segment are mounted pivotable about a vertical segment pivot axis 213c' and 213c" respectively to a tensioner frame support assembly 216. According to the first aspect of the invention, this tensioner frame support assembly 216 is displaceably supported by tensioner rail 220 provided on the pipeline launch tower 2015. The segments 213a' and 213a" are movable between a closed operational position as visible in FIG. 6a wherein the segments are conjoined at point 213d to form an enclosing pipeline annulus in which the tracks are adapted to engage the pipeline; and an open retracted position wherein the first and second segments are disconnected and separated, thereby creating a clear envelope in the firing line, as visible in FIG. 6b.

According to the second aspect of the invention, a vertical trolley rail 230 is provided, which is supported by the tensioner frame support assembly 216 between the two vertical segment pivot axes 213c' and 213c". Not shown is an auxiliary trolley adapted to guide an accessory along the vertical trolley rail in the pipeline launch trajectory when the first and second segments are in the open retracted position.

Advantageously, the vertical trolley rail extends between a position below the tensioners, possibly below the hang off clamp, and a position adjacent the pipeline guide, such that the auxiliary trolley is movable from a position above the uppermost tensioner to a position below the lowermost tensioner.

The invention claimed is:

1. A marine reel lay method pipeline installation vessel for laying on the seabed a pipeline and one or more accessories which are to be connected to the pipeline, forming a launched pipeline having a weight, wherein the vessel comprises:
   one or more pipeline storage reels for storage of pipeline to be laid;
   a pipeline launch tower mounted to the vessel, which pipeline launch tower is adapted to launch the pipeline in a firing line along said tower;
   a pipeline guide which is supported at an elevated position by the pipeline launch tower, which pipeline guide is adapted to guide the pipeline from the storage reel over the pipeline guide into the firing line;
   one or more tensioners, each tensioner comprising a tensioner frame supported by the pipeline launch tower and multiple tracks supported by said tensioner frame, said tracks being adapted to engage the pipeline and to support at least part of the weight of the launched pipeline in the firing line;
   a hang off device supported in the lower part of the firing line, adapted to clamp and support the weight of the launched pipeline in the firing line;
   an abandonment and recovery (A&R) system comprising at least one A&R winch and A&R cable, and an A&R sheave arrangement with one or more sheaves provided at an upper position in the firing line, said one or more sheaves being supported by the pipeline launch tower, adapted to raise, lower and support the weight of the launched pipeline in the firing line; and
   an accessory handling device adapted to position the accessory in an accessory position in the firing line between the hang off device and the A&R sheave arrangement,
   wherein the one or more tensioner frames are displaceable supported by a tensioner rail mounted to the pipeline launch tower, extending parallel to the firing line, allowing the one or more tensioners to be displaceable in the firing line, along the pipeline launch tower, at least between an accessory handling position wherein the one or more tensioners have moved away from the accessory position and a distinct pipelaying position wherein the one or more tensioners at least partially overlap the accessory position, and
   wherein a tensioner displacement drive is provided to support and displace the one or more tensioners along the pipeline launch tower.

2. The marine reel lay method pipeline installation vessel according to claim 1, wherein the tensioner rail allows the one or more tensioners to be displaceable in the firing line, along the pipeline launch tower, at least between an upper accessory handling position wherein the one or more tensioners have moved above the accessory position and a lower pipelaying position wherein the one or more tensioners at least partially overlap the accessory position.

3. The marine reel lay method pipeline installation vessel according to claim 2, wherein the pipeline guide is movably supported via a guide frame by the tower, the guide frame enabling displacement of the pipeline guide between a pipelaying position in which the pipeline guide guides the pipeline from the storage reel over the pipeline guide into the firing line, and a retracted, non-operable position, wherein the pipeline guide has moved away from the firing line, wherein the upper accessory handling position of the tensioner frame overlaps the pipelaying position of the pipeline guide in the firing line.

4. The marine reel lay method pipeline installation vessel according to claim 2, wherein the distance between the upper accessory handling position and the pipelaying position is 8-12 meters.

5. The marine reel lay method pipeline installation vessel according to claim 2, wherein the pipeline launch tower and the tensioner frame are provided with cooperating position fixation devices, to fixate the tensioner with respect to the pipeline launch tower at least in the upper accessory handling position and the pipelaying position.

6. The marine reel lay method pipeline installation vessel according to claim 1, wherein an upper tensioner and a lower tensioner are provided, the tensioner frame of the lower tensioner being supported by the tensioner frame of the upper tensioner, and wherein the tensioner displacement drive engages the tensioner frame of the upper tensioner.

7. The marine reel lay method pipeline installation vessel according to claim 1, wherein the one or more tensioner frames are provided with wheels engaging on the tensioner rail.

8. The marine reel lay method pipeline installation vessel according to claim 1, wherein the one or more tensioner frames are displaceable supported by the tensioner rail via at least one tensioner frame support assembly, and wherein the tensioner frame comprises two or more segments, comprising a first segment and at a second segment each including at least one track, wherein both the first and second segment are mounted pivotable about a vertical segment pivot axis to a tensioner frame support assembly, the segments being movable between a closed operational position wherein the segments are conjoined to form an enclosing pipeline annulus in which the tracks are adapted to engage the pipeline; and an open retracted position wherein the first and second segments are disconnected and separated, thereby creating a clear envelope in the firing line.

9. The marine reel lay method pipeline installation vessel according to claim 8, further comprising a vertical trolley rail supported by the tensioner frame support assembly between the two vertical segment pivot axes, and an auxiliary trolley adapted to guide an accessory along the vertical trolley rail in the pipeline launch trajectory when the first and second segments are in the open retracted position.

10. The marine reel lay method pipeline installation vessel according to claim 9, further comprising a vertical trolley rail segment, adapted to be positioned in line with the vertical trolley rail below the tensioners adjacent the accessory position, possibly until a position below the hang off device, such that the auxiliary trolley is movable to a position below the lowermost tensioner.

11. The marine reel lay method pipeline installation vessel according to claim 1, further comprising one or more centralisers, being adapted to centralise the pipeline in the firing line.

12. The marine reel lay method pipeline installation vessel according to claim 11, wherein the one or more centralisers are supported by the tensioner frame below the tensioner tracks.

13. The marine reel lay method pipeline installation vessel according to claim 11, wherein the one or more centralisers are mounted movable between a horizontal operational position wherein the centraliser is in the firing line, and a non-operational vertical position wherein the firing line is cleared.

14. The marine reel lay method pipeline installation vessel according to claim 1, further comprising a hoist beam, supported by the lowermost tensioner frame below the tensioner tracks.

15. The marine reel lay method pipeline installation vessel according to claim 14, wherein the hoist beam is the accessory handling device and adapted to position the accessory in an accessory position in the firing line between the hang off device and the A&R sheave arrangement.

16. The marine reel lay method pipeline installation vessel according to claim 1, wherein the tensioner displacement drive comprises a cable and winch.

17. The marine reel lay method pipeline installation vessel according to claim 1, wherein there are one or more end connectors on the pipeline to form the launched pipeline having a weight,
wherein the accessory handling device is adapted to position an end connector in an end connector entry position in the firing line above the one or more tensioners, and
wherein the tensioner rail allows the one or more tensioners to be displaceable in the firing line, along the pipeline launch tower, at least between a lower parking position wherein the one or more tensioners have moved below the end connector entry position and an upper pipelaying position wherein the one or more tensioners at least partially overlap the end connector entry position.

18. A marine reel lay method for launching in a firing line a pipeline with an end connector at its trailing end, thereby forming a launched pipeline having a weight, comprising the steps of:
providing tensioners wherein the tracks and/or parts of the tensioner frame supporting the tracks are mounted in a movable manner to change the gap between the tracks between a pipeline engagement position wherein the gap is relatively narrow and an accessory passage position wherein the gap is relatively large;
positioning the one or more tensioners in the pipeline engagement position and in a pipelaying position and laying the pipeline;
displacing by a tensioner displacement drive the one or more tensioners engaging the pipeline to a lowermost parking position, distinct from the pipelaying position, wherein the one or more tensioners have moved away from an end connector entry position;
continuing pipelaying, the end connector entering the end connector entry position in the firing line by an end connector handling device,
connecting the end connector to an abandonment and recovery (A&R) system;
positioning the one or more tensioners in the accessory passage position; and
lowering the end connector and the pipeline connected thereto by the A&R system past the one or more tensioners.

19. A marine reel lay method for launching in a firing line a pipeline with an end connector at its leading end, thereby forming a launched pipeline having a weight, comprising the steps of:
providing tensioners wherein the tracks and/or parts of the tensioner frame supporting the tracks are mounted in a movable manner to change the gap between the tracks between a pipeline engagement position wherein the gap is relatively narrow and an accessory passage position wherein the gap is relatively large;
positioning the tensioners by a tensioner displacement drive in the accessory passage position and in a lowermost end connector handling position, distinct from a pipelaying position, wherein the one or more tensioners have moved away from an end connector entry position;
the end connector entering the end connector entry position in the firing line by an end connector handling device;
lowering the end connector and the pipeline connected thereto by the end connector handling device past the one or more tensioners; and
positioning the one or more tensioners in the pipeline engagement position and in the pipelaying position and laying the pipeline.

20. A marine reel lay method pipeline installation vessel for laying on the seabed a pipeline and one or more accessories which are to be connected to the pipeline, forming a launched pipeline having a weight, wherein the vessel comprises:
one or more pipeline storage reels for storage of pipeline to be laid;
a pipeline launch tower mounted to the vessel, which pipeline launch tower is adapted to launch the pipeline in a firing line along said tower;
a pipeline guide which is supported at an elevated position by the pipeline launch tower, which pipeline guide is adapted to guide the pipeline from the storage reel over the pipeline guide into the firing line;
one or more tensioners, each tensioner comprising a tensioner frame supported by the pipeline launch tower and multiple tracks supported by said tensioner frame, said tracks being adapted to engage the pipeline and to support at least part of the weight of the launched pipeline in the firing line;

a hang off device supported in the lower part of the firing line, adapted to clamp and support the weight of the launched pipeline in the firing line; and an abandonment and recovery (A&R) system comprising at least one A&R winch and A&R cable, and an A&R sheave arrangement with one or more sheaves provided at an upper position in the firing line, said one or more sheaves being supported by the pipeline launch tower, adapted to raise, lower and support the weight of the launched pipeline in the firing line, wherein the tensioner frame comprises two or more segments, comprising a first segment and at a second segment each including at least one track, wherein both the first and second segment are mounted pivotable about a vertical segment pivot axis to the pipeline launch tower, the segments being movable between a closed operational position wherein the segments are conjoined to form an enclosing pipeline annulus in which the tracks are adapted to engage the pipeline; and an open retracted position wherein the first and second segments are disconnected and separated, thereby creating a clear envelope in the firing line, further comprising a vertical trolley rail supported by the pipeline launch tower between the two vertical segment pivot axes, and an auxiliary trolley adapted to guide an accessory along the vertical trolley rail in the pipeline launch trajectory when the first and second segments are in the open retracted position.

21. The marine reel lay method pipeline installation vessel according to claim 20, wherein the vertical trolley rail extends between a position below the tensioners and a position adjacent the pipeline guide, such that the auxiliary trolley is movable from a position above the uppermost tensioner to a position below the lowermost tensioner.

\* \* \* \* \*